US012744952B1

(12) United States Patent
Nann et al.

(10) Patent No.: US 12,744,952 B1
(45) Date of Patent: Sep. 22, 2026

(54) COMPUTER-IMPLEMENTED METHODS FOR GENERATION OF A MANIFEST FOR A VIDEO

(71) Applicant: Amazon Technologies, Inc., Seattle, WA (US)

(72) Inventors: Paul Nann, Sammamish, WA (US); Naveen Kumar Chandravanshi, Bellevue, WA (US); Artem Rakov, Toronto (CA); Kyle Koceski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/898,297

(22) Filed: Sep. 26, 2024

(51) Int. Cl.
*H04N 7/173* (2011.01)
*H04N 21/239* (2011.01)
*H04N 21/262* (2011.01)

(52) U.S. Cl.
CPC ... *H04N 21/26258* (2013.01); *H04N 21/2393* (2013.01)

(58) Field of Classification Search
CPC ..................... H04N 21/26258; H04N 21/2393
See application file for complete search history.

(56) References Cited

U.S. PATENT DOCUMENTS 10,432,693 B2 * 10/2019 Gibson ................. H04L 67/535
11,758,200 B2 * 9/2023 Reitmeyer ............ H04L 65/765 725/116
12,547,678 B1 * 2/2026 Bertheussen ....... G06F 21/1011
2014/0180818 A1 * 6/2014 Mistler .............. G06Q 30/0259 705/14.57
2017/0280181 A1 * 9/2017 Ramaley ............ H04N 21/6373
2023/0111456 A1 * 4/2023 Lamere ............ H04N 21/26258 725/116
2024/0276076 A1 * 8/2024 Kozuback .............. H04N 21/84

* cited by examiner

*Primary Examiner* — Annan Q Shang
(74) *Attorney, Agent, or Firm* — NICHOLSON DE VOS WEBSTER & ELLIOTT LLP

(57) ABSTRACT

Techniques for generating a manifest, for a multimedia file, that utilizes a hierarchical data structure with (i) nodes for the manifest request parameters and (ii) the instructions for how to generate a manifest based on that manifest request parameter included within the node are described. According to some examples, a computer-implemented method includes receiving, at a content delivery service from a media player device, a manifest request comprising a plurality of manifest request parameters for a media file; determining, by the content delivery service, a first node of a tree data structure based on a first manifest request parameter of the plurality of manifest request parameters of the manifest request; determining, by the content delivery service, a second node of the tree data structure based on a second manifest request parameter of the plurality of manifest request parameters of the manifest request; determining, by the content delivery service, a third node of the tree data structure based on the first manifest request parameter and the second manifest request parameter of the plurality of manifest request parameters of the manifest request; determining, by the content delivery service, a first manifest instruction from the first node, a second manifest instruction from the second node, and a third manifest instruction from the third node; generating, by the content delivery service, a manifest for the media file based on the first manifest instruction, the second manifest instruction, and the third manifest instruction; and sending, by the content delivery service, the manifest to the media player device.

20 Claims, 15 Drawing Sheets

COMPUTER-IMPLEMENTED METHODS FOR GENERATION OF A MANIFEST FOR A VIDEO

BACKGROUND

Service providers or content creators (such as businesses, artists, media distribution services, etc.) can employ one or more data centers to deliver content (such as web sites, web content, videos, or other digital data) to users or clients. Certain video streaming technologies utilize a manifest file to indicate various media content (e.g., video, audio, timed text, language adaptations, etc.), various encodings (e.g., Advanced Video Coding (AVC), High Efficiency Video Coding (HEVC), AOMedia Video 1 (AV1), Advanced Audio Coding (AAC), Dolby Digital+, etc.), and various quality (e.g., standard definition (SD), high definition (HD), ultra-high definition (UHD), etc.) parameters. In certain examples, a video can include a broad set of features, but different devices and/or playback environments have various supported capabilities. For example, not all devices support all codecs and/or not all setups are configured for an audio output. Additionally, various commerce-based decisions can be made to provide various entitlements, for example, customers can pay for higher-quality (e.g., UHD) content. Given the cardinality of such scenarios, it is infeasible to produce separate encoded assets (e.g., videos) for each variant, e.g., for each possible combination of media content, encodings, and/or quality.

BRIEF DESCRIPTION OF DRAWINGS

Various examples in accordance with the present disclosure will be described with reference to the following drawings.

DETAILED DESCRIPTION

Figure 1:
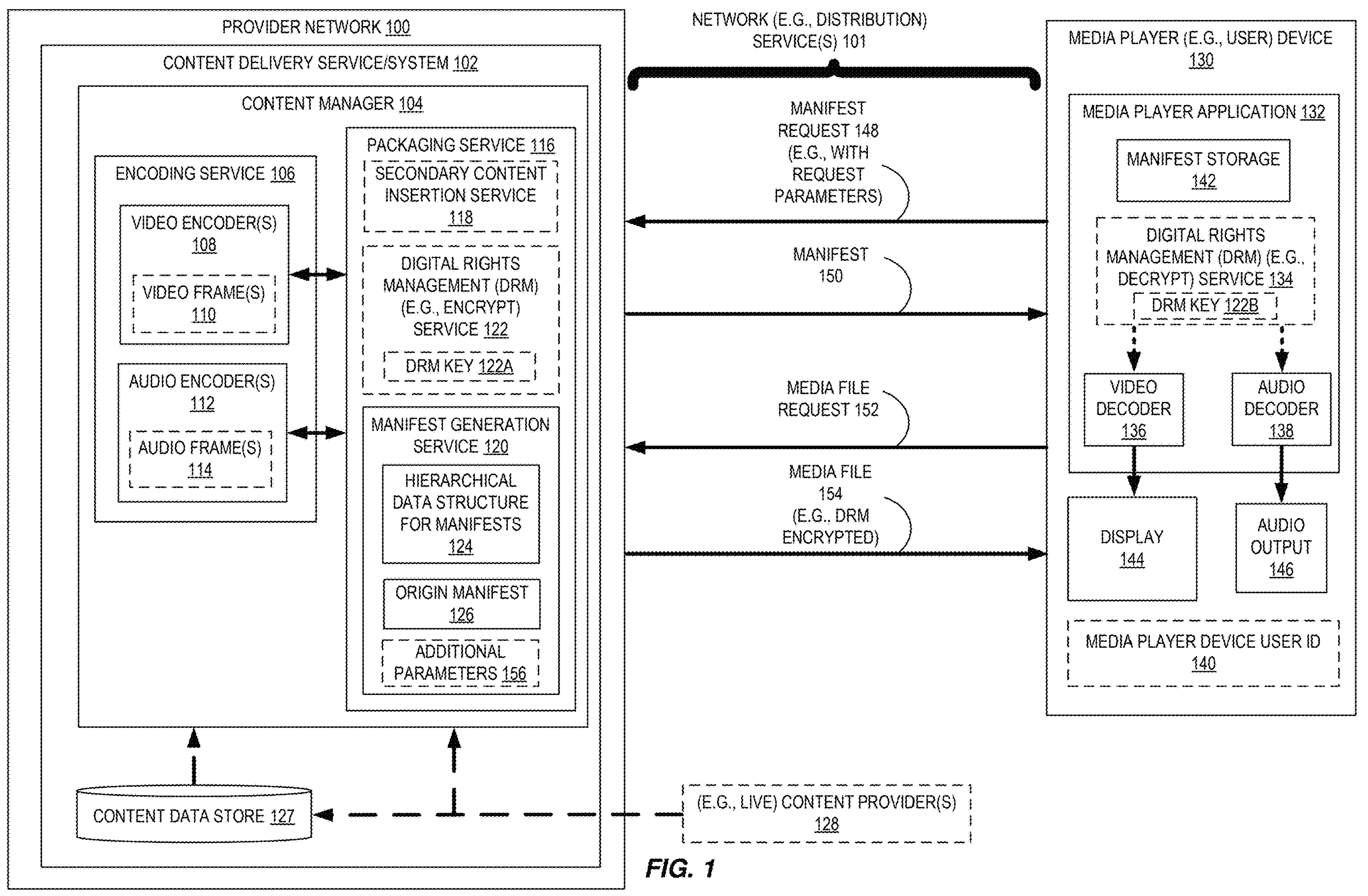
FIG. 1 is a diagram illustrating an environment including a content delivery service/system, comprising a manifest generation service, coupled to a media player (e.g., user) device according to some examples.

The present disclosure relates to methods, apparatus, systems, and non-transitory computer-readable storage media for generating a manifest for a media file. Certain examples herein are directed to a manifest generation service that utilizes a hierarchical data structure with nodes for manifest request parameters. As noted above, it is infeasible to produce separate encoded assets (e.g., videos) for each variant, e.g., for each possible combination of media content, encodings, and/or quality. As such, a manifest generation service (e.g., edge-service) may be utilized to transform origin manifests with all or many formats into more-specific filtered variants. However, just as the cardinality makes maintaining separate encoded assets for each variant infeasible, it is infeasible to readily maintain the policies which instruct the edge service how to filter. For example, a manifest request may indicate that multiple policies apply, yet one or more of those policies conflict (e.g., are mutually exclusive) and/or overlap with each other. For certain video streaming, a request to generate a manifest is to be serviced in real time (or near real time).

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens, e.g., in the context of a system that processes data, these terms may mean processing data as it is received as opposed to storing or persisting the data once received for processing later on.

Thus in certain examples a manifest generation service is responsible for generating in real time (or near real time) instructions for how a manifest is formed (e.g., manipulated) for a specific playback call, e.g., and these instructions are used (e.g., on the delivery path) to generate in real time (or near real time) the manifest between an end user and content origin. In certain examples, the manifest generation service (e.g., a stream manipulation instruction service thereof) generates instructions based on information from (i) an asset produced by an encoding, (ii) a device used to start playback, (iii) entitlements for a customer, etc. In certain examples, the manifest generation service (e.g., a stream manipulation instruction service thereof) supports preconfigured overrides which may be referred to as policy. In certain examples, these policies contain specific instructions on how a manifest should be manipulated for certain groups of matchers (e.g., parameters in an incoming manifest request). In certain examples, a request to the manifest generation service results in resolving multiple policies based on request parameters. How quickly a manifest generation service identifies the right set of policies for a manifest request has a direct impact on time to first frame (TTFF). How accurately the manifest generation service identifies the impact (e.g., consequences) of adding a new policy or new policies may also be significant.

Certain examples herein provide a technical solution to these technical problems by implementing a manifest generation service that utilizes a hierarchical data structure of nodes, e.g., where (i) each node is identified based on a manifest request parameter of a manifest request, and (ii) the node identifies an instruction that is applicable for that manifest request parameter. Thus in certain examples, the hierarchical data structure of these manifest request parameter nodes allows the manifest generation service to identify the right set of policies for a manifest request, for example, and provides for real time (or near real time) generation of the manifest, e.g., and thus minimizes the time to first frame. Thus in certain examples, the hierarchical data structure of these manifest request parameter nodes allows the identification of the impact (e.g., consequences) of adding a new policy or new policies. The way a computer (e.g., computer-implement manifest generation service) stores and retrieves this data (e.g., not a human and not with pen-and-paper) in memory, in combination with the specific hierarchical data structure (e.g., policy tree) for manifest manipulation recited herein, demonstrates an improvement to computer functionality (e.g., an improvement to a computer-implemented manifest generation service).

One option is to explicitly denote each input condition explicitly, and the appropriate output policy explicitly, potentially with some default fallback for the common case. However, this is difficult and time-intensive to maintain (e.g., when adding and/or deleting a policy).

Another option is for the manifest generation service to utilize (1) a re-usable policy defining instruction behavior for manifest manipulation, (2) matching criteria which map conditions (e.g., manifest request parameters) to re-usable policies, (3) a hierarchical data structure (e.g., N-ary tree) which optimizes the lookup of matches of the conditions to policies (e.g., instructions thereof), and/or (4) an accumulation/conflict-resolution ruleset when multiple matched policies (e.g., instructions thereof) overlap. Example details of the structure of the hierarchical data structure (e.g., N-ary tree), the matching-criteria lookup, policy aggregation, and conflict resolution (e.g., merging) are discussed below.

In certain examples, the generation of the full (e.g., policy) hierarchical data structure (e.g., N-ary tree) does not necessarily need to be created at initialization of the manifest generation service (e.g., application). To reduce application startup time, in certain examples, the policy hierarchical data structure (e.g., N-ary tree) is constructed on-demand as individual requests are made for particular dimensions (e.g., level) of the tree, for example, only when a particular device type (e.g., device type ID (DTID)) makes a request are its children nodes of the hierarchical data structure (e.g., N-ary tree) resolved from the source files.

Figure 4:
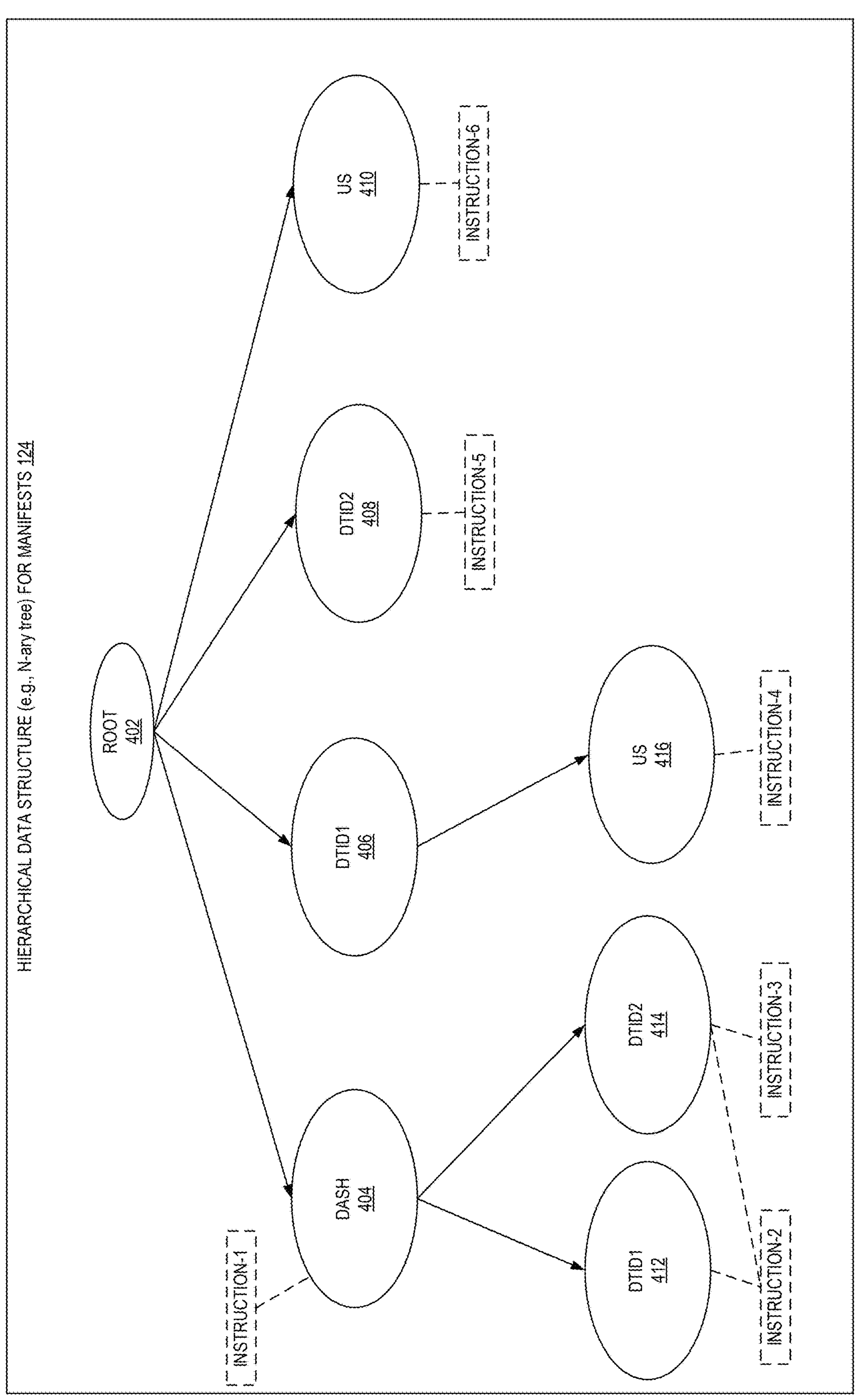
FIG. 4 is a diagram illustrating a hierarchical data structure for manifests according to the plurality of manifest manipulation policies in FIG. 3 according to some examples.

In certain examples, policies are represented in configuration files, so it is advantageous to ensure that policies and their respective policy hierarchical data structure (e.g., N-ary tree) can be runtime updated, e.g., without shutting down the entire service. To provide for this in certain examples, a new policy hierarchical data structure (e.g., N-ary tree) is constructed and merged into an existing policy hierarchical data structure (e.g., N-ary tree) representation, e.g., overwriting previous nodes which differ or adding new nodes where relevant. In certain examples where a policy hierarchical data structure (e.g., N-ary tree) is resolved on-demand, previous (e.g., legacy) nodes of hierarchical data structure (e.g., N-ary tree) can be un-resolved and reference the new policy. In certain examples, the hierarchical data structure is an N-ary tree data structure (e.g., as shown in FIG. 4), e.g., where each node consists of records and a list of references to its children (e.g., where duplicate references are not allowed). In certain examples (e.g., unlike a linked list), each node of the N-ary tree stores the address of multiple nodes. In certain examples, every node stores the address of its children. In certain examples, the very first node's address is stored in a separate pointer called root.

Turning now to the figures, FIG. 1 is a diagram illustrating an environment including a content delivery service/system 102, comprising a manifest generation service 120, coupled to a media player (e.g., user) device 130 according to some examples.

In certain examples, the provider network 100 (e.g., cloud provider) is coupled to the media player device 130 via network (e.g., distribution) service(s) 101. In certain examples, media player (e.g., client) device 130 is to play a media file 154 (e.g., live stream), for example, (e.g., on-demand and/or linear television (TV) (e.g., that can be viewed according to a set schedule, e.g., not on demand)) audio/video and/or image(s), e.g., sent via network (e.g., distribution) services 101. In certain examples, the media sent is encrypted media file 154 (e.g., video/audio).

In certain examples, content delivery service/system 102 streams vast numbers of (e.g., live) media (e.g., audio and/or video) to end users (e.g., customers of the content delivery service/system) in multiple formats. In certain examples, a content delivery service/system 102 provides video variants from multiple (e.g., redundant) video encoders, multiple audio/video packaging formats (e.g., Smooth Streaming standard, a HyperText Transfer Protocol (HTTP) Live Streaming (HLS) standard, and/or a Moving Picture Experts Group Dynamic Adaptive Streaming over HTTP (MPEG-DASH) standard for different device types), different resolutions (e.g., ultra-high-definition (UHD), 4K, high-definition (HD), and/or standard definition (SD) resolutions), at multiple bitrates, low-latency profiles (e.g., to adapt to network conditions), and/or with secondary content (e.g., advertisement) inserted (e.g., at various points regionally and/or based on customer preferences). In certain examples, a content delivery service/system 102 provides audio variants from multiple (e.g., redundant) audio encoders, with multi-channel options, language variants, and/or other combinations. In certain examples, there are thousands of unique streams, e.g., with the potential that each customer has a unique stream.

In certain examples, a content provider 128 is to send content to a content data store 127 (e.g., which may be implemented in one or more data centers) and/or content manager(s) 104 (e.g., a single content manager or multiple content managers). In certain examples, a content provider 128 is on site to capture video (e.g., and audio) of a live event. In certain examples, content provider 128 is to encode the resulting output and send that encoded content to one or more downstream entities (e.g., content delivery service/system 102), e.g., via one or more networks.

As one example, a media file (e.g., including a video file and audio file) (e.g., a media container) that is to be encoded is accessed from the content data store 127 by content manager 104. In certain examples, the media file may be uploaded to content data store 127 by content provider(s) 128 or provided directly (e.g., as live content) to one or more content managers 104 by content provider(s) 128 (e.g., from a live content encoder).

In certain examples, the content manager 104 controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 127) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 118 is to insert the secondary content into the main content.

In certain examples, packaging service 116 includes one or more manifests, e.g., identifying the media file(s) (e.g., fragments, streams, etc.). In certain examples, manifest generation service 120 is to generate a manifest 150, from an origin manifest 126, for a particular media file (e.g., a particular title) that identifies a proper subset of video and audio representations of the media file for a particular viewer device 130 (e.g., based on the client's media player (e.g., determined from its media player device user ID value 140, e.g., DTID), display 144 resolution, audio output 146 capabilities, and/or available bandwidth). In certain examples, the content is stored in the content delivery service/system 102 in two parts: (i) the origin manifest 126 of the available media representations (e.g., the URL address(es) and, optionally, other characteristics) and (ii) the media files (e.g., representations) (e.g., stream of fragments) in a single (e.g., container) or multiple files (e.g., in content data store 127).

In certain examples, a media player (e.g., viewer) device 130 is to send a manifest request 148, e.g., along with one or more manifest request parameters, for example, one or any combination of a particular media content (e.g., video, audio, timed text, language adaptations, etc.), encoding (e.g., AVC, HEVC, AV1, AAC, Dolby Digital+, etc.), and/or various quality (e.g., standard definition (SD), high definition (HD), ultra-high definition (UHD), etc.). In certain examples, the provider network 100 (e.g., manifest generation service 120 thereof) is to, in response to receipt of the manifest request 148, generate manifest 150 from hierarchical data structure 124 for manifests (e.g., hierarchical data structure 124 for origin manifest 126), e.g., N-ary tree data structure for manifests. In certain examples, the media player (e.g., viewer) device 130 is to read the manifest 150 (e.g., from manifest storage 142) sent in response to manifest request 148 before the client device 130 makes media file request 152 for the media from that manifest, and thus accesses media file(s) 154 (e.g., video fragments and/or corresponding audio fragments), e.g., media file(s) 154 store in content data store 127.

In certain examples, the manifest generation service further generates manifest 150 based on one or more additional parameters 156, e.g., a certain resolution (e.g., UHD) that the particular media player device 130 (e.g., a user account thereof) is entitled (or not entitled) to receive, and/or which data center of a plurality of (e.g., geographically distributed) data centers to service the manifest request (e.g., which data center to send the manifest) and/or the media file request (e.g., which data center to send the media file).

In certain examples, the content delivery service/system 102 includes a Digital Rights Management (DRM) (e.g., encryption) service 122, e.g., to encrypt a media file according to a DRM key 122A.

In certain examples, media player device 130 executes a media player application 132. In certain examples, media player application 132 includes a corresponding support platform, e.g., implemented on one or more provider network(s) 100. In certain examples, media player application 132 is provided data (e.g., content) by platform 1 (e.g., content delivery service/system 102). In certain examples, media player application 132 includes a corresponding graphical user interface (GUI) that is displayed on display 144, e.g., to allow a user to select content for viewing and/or listening.

In certain examples, media player device 130 (e.g., media player application 132) includes a digital rights management (DRM) (e.g., decryption) service 134. In certain examples, the encrypted media (e.g., video/audio) 154 (e.g., encrypted by the DRM (e.g., encryption) service 122 of the content delivery service/system 102 according to a DRM key 122A) is decrypted by the digital rights management (DRM) (e.g., decryption) service 134 of the media player device 130, for example, by DRM key 122B. In certain examples, the DRM key 122B is provided to an authorized media player device 130 to allow the media player device 130 to decrypt (e.g., and allow the user to view/listen to) the media file. In certain examples, the DRM key 122B is to match the DRM key 122A to allow the media player device 130 to decrypt (e.g., and allow the user to view/listen to) the media file. In certain examples, a DRM key (e.g., DRM key 122B) is a product key, e.g., that represents a license to a particular media file. In certain examples, a DRM service (e.g., DRM service 122 and DRM service 134) is used to (e.g., continually for a single file access or a single time for each single file access) check that the media player device 130 is allowed to access (e.g., decrypt) the encrypted media (e.g., video/audio) 154. In certain examples, a single media file includes a single DRM key for the media (e.g., video and audio), e.g., "single key" mode. In certain examples, a single media file includes multiple (e.g., dual) DRM keys for the media (e.g., one key for the video and a different key for the audio), e.g., "dual key" mode.

In certain examples, media player device 130 includes a video decoder 136 to decode (e.g., decrypted) video for viewing on display 144 and/or an audio decoder 138 to decode (e.g., decrypted) audio for outputting on audio output (e.g., speaker) 146.

In certain examples, the display 144 and/or audio output 146 (e.g., speaker(s)) are part of the media player device 130, e.g., a smart television device or smart phone device.

In certain examples, media player device 130 includes a media player device user identification (ID) 140, e.g., to uniquely identify the user of that media player device 130. In certain examples, DRM service 134 uses the media player device user ID 140 for DRM protection.

In certain examples, a policy is identified based on the matchers it is applicable to. Example of matchers are StreamingProtocol, DTID, etc. In certain examples, each matcher can have multiple values (e.g., "MatcherValue", such as a StreamingProtocol can have values of DASH, HLS and SMOOTH, and DeviceTypeId can have values of ABCDEFGHIJKLMN, etc.).

In certain examples, the instructions indicate specific operations contained in the policy, e.g., where these instructions are applied to the superset of manifests to generate a particular manifest for a particular device and/or media file, e.g., applied by manifest generation service (e.g., dynamic manifest service).

Figure 2:
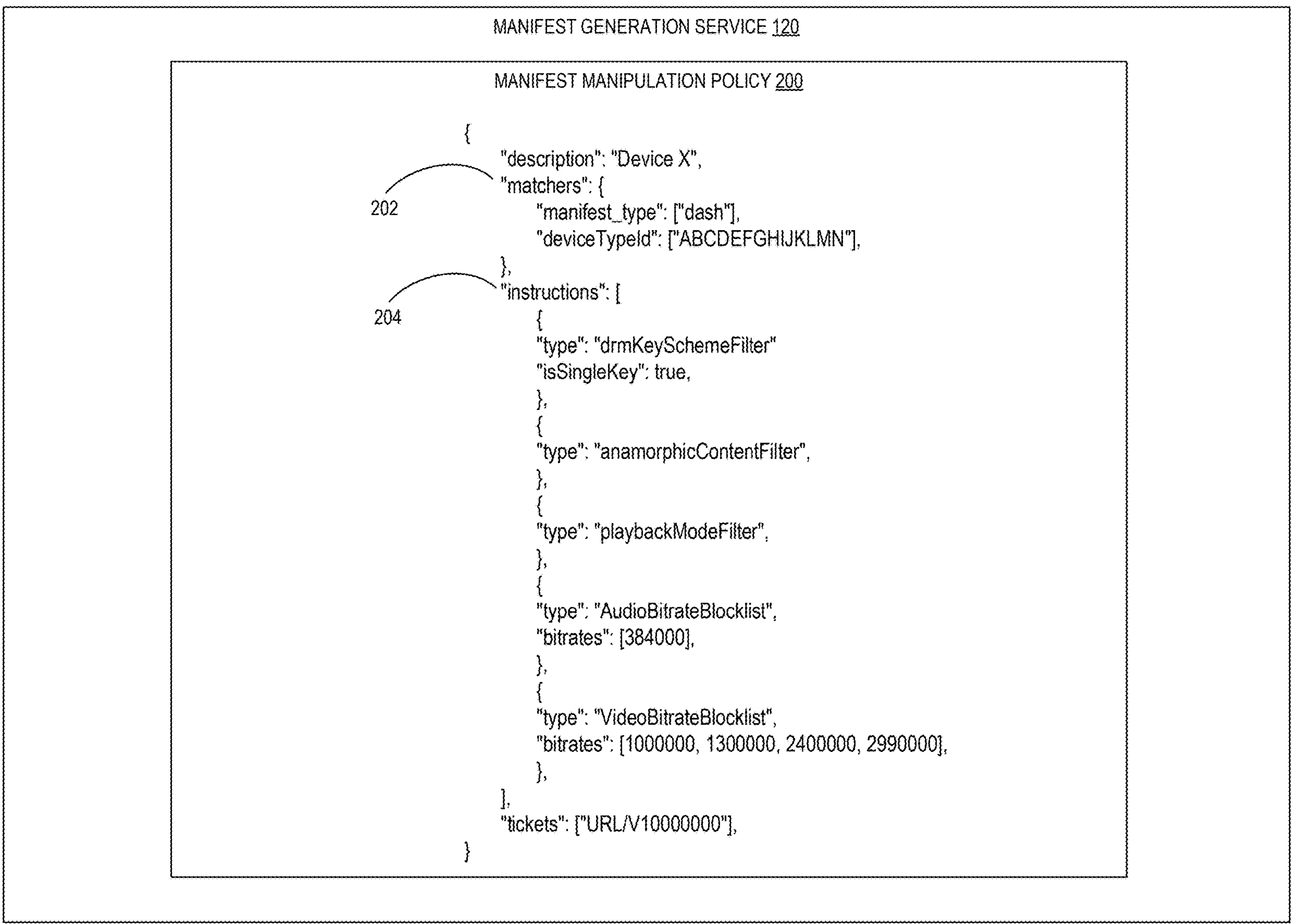
FIG. 2 is a diagram illustrating a manifest manipulation policy according to some examples.

FIG. 2 is a diagram illustrating a manifest manipulation policy 200 according to some examples. The depicted policy 200 includes three parts: a description of the device (e.g., name), a field for "matchers" 202 (e.g., manifest request parameters), and a field for the instructions 204 (e.g., manifest manipulation instructions, that when executed, are to cause the manifest to be pared down accordingly). Depicted instructions 204 include indicating a single DRM key is to be used, to use an anamorphic content filter, to use a playback mode filter, to block certain audio bitrates (e.g., 384000 Hertz or higher), and to block certain video bitrates. Policy 200 may also include a "tickets" field to identify why a policy exists.

Figure 3:
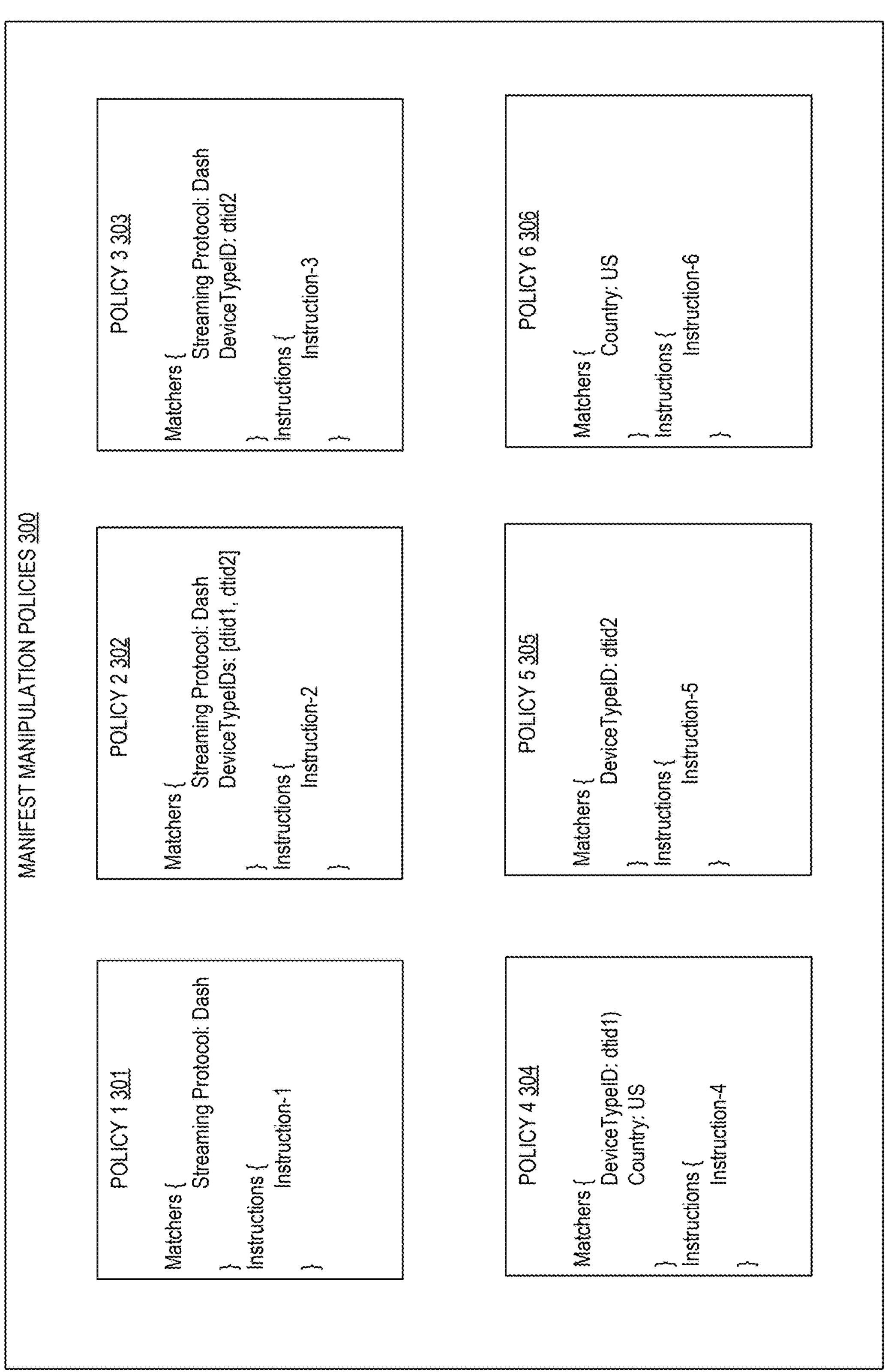
FIG. 3 is a diagram illustrating a plurality of manifest manipulation policies according to some examples.

FIG. 3 is a diagram illustrating a plurality of manifest manipulation policies 300 (e.g., 301-306) according to some examples. In FIG. 1, policy 1 301 includes a streaming protocol type of matcher of DASH and a corresponding instruction 1, policy 2 302 includes a streaming protocol type of matcher of DASH, a device type ID matcher of dtid1 and dtid2, and a corresponding instruction 2, policy 3 303 includes a streaming protocol type of matcher of DASH, a device type ID matcher of dtid2, and a corresponding instruction 3, policy 4 304 includes a device type ID matcher of dtid1, a country type matcher of US, and a corresponding instruction 4, policy 5 305 includes a device type ID matcher of dtid2 and a corresponding instruction 5, and policy 6 306 includes a country type matcher of US, and a corresponding instruction 6.

A technical problem is how to arrange and parse these stored policies so that an incoming manifest request matches the right set of policies to be applied. In certain examples, the technical solution is that a computer-implemented manifest generation service is to utilize a hierarchical data structure (e.g., N-ary tree data structure) to satisfy one or any combination of the following: (1) represent all instructions from all policies present in persistent datastore against policy matchers, (2) the instructions should be searchable in the hierarchical data structure (e.g., policy tree) against right set of input matchers, (3) hierarchical data structure (e.g., policy tree) should communicate the granularity of all the instructions resolved for a request, and/or (4) hierarchical data structure (e.g., policy tree) should communicate about policies that resolved instructions are related to.

In certain examples, the policies are represented in an N-ary tree with a node as one of the matcher values. In certain examples, a node identifies associated instructions, e.g., to associate the combination of matcherValues from root node to the given node. In certain examples, the root node is a node holding global policy and is always applied irrespective of matchers.

FIG. 4 is a diagram illustrating a hierarchical data structure 124 (e.g., N-ary tree) for manifests according to the plurality of manifest manipulation policies in FIG. 3 according to some examples. In FIG. 4, root node 402 may be used to store a global policy. In FIG. 4, node 404 corresponds to policy 1 301 in FIG. 3 (and thus the node indicates a streaming protocol type of matcher of DASH and a corresponding instruction 1), nodes 412 and 414 correspond to policy 2 302 (and thus the nodes indicate a streaming protocol type of matcher of DASH (via node 404), a device type ID matcher of dtid1 (via node 412), a device type ID dtid2 (via node 414), and a corresponding instruction 2), node 414 also corresponds to policy 3 303 (and thus the nodes indicate a streaming protocol type of matcher of DASH (via node 404), a device type ID matcher of dtid2 (vide node 414), and a corresponding instruction 3), node 404 corresponds to policy 4 304 (and thus the nodes indicate a device type ID matcher of dtid1 (via node 406), a country type matcher of US (via node 416), and a corresponding instruction 4), node 408 corresponds to policy 5 305 (and thus the node indicates a device type ID matcher of dtid2 and a corresponding instruction 5), and node 410 corresponds to policy 6 306 (and thus the node indicates a country type matcher of US, and a corresponding instruction 6). Thus a manifest request that includes certain of the matcher types is to traverse the hierarchical data structure 124 (e.g., N-ary tree) to determine the set of one or more instructions that apply to that manifest request, e.g., and the instructions are then used to parse the origin manifest 126 according to those instructions by manifest generation service (e.g., stream manipulation instruction service).

Certain examples herein sort matchers for a policy in a pre-specified order before adding it to the hierarchical data structure (e.g., N-ary tree), e.g., to ensure the hierarchical data structure (e.g., N-ary tree) is arranged in order of matcher from top to bottom meaning every branch in the tree is in the same order of matcher to keep the hierarchical data structure (e.g., N-ary tree) deterministic and save extra traversal time during policy resolution.

In certain examples, the hierarchical data structure (e.g., N-ary tree) is used to find the applicable (e.g., "right") set of instructions to be applied for a given manifest request. In certain examples, those instructions are collected and sent for further processing, e.g., to an accumulator (e.g., accumulate 806 in FIG. 8). In certain examples, the accumulator is to resolve conflicting instructions, e.g., where it chooses the one instruction (or values thereof) associated with more granular matchers. In certain examples, the granularity of an instruction is how defined it is across all the available matcher matches, e.g., such that the policy associated with {Dash, dtid1} is more granular (e.g., a deeper level) compared to policy associated with just {Dash} and less granular than the policy associated with {dash, dtid1, US}. For tree representation this granularity can be manifested in terms of tree depth. However, in certain examples, there may be two or more conflicting instructions on same level, e.g., {dash, US} at node 416 and {dash, dtid1} at node 412. In certain of those examples, granularity is defined based on the sort order of matchers described above.

Figure 5:
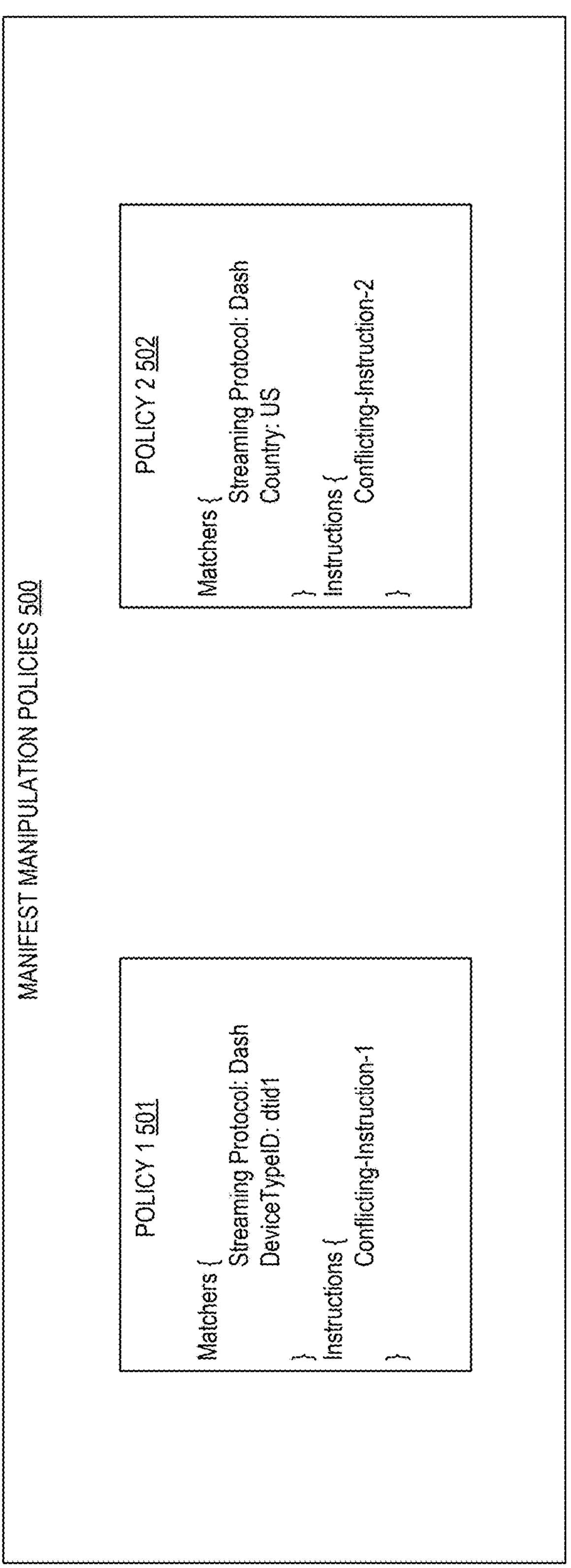
FIG. 5 is a diagram illustrating a plurality of manifest manipulation policies with conflicting instructions according to some examples.

FIG. 5 is a diagram illustrating a plurality of manifest manipulation policies 500 with conflicting instructions according to some examples. Depicted manifest manipulation policies 500 include a first policy 1 501 where the matchers and their values {matcher: values} are {Streaming Protocol: Dash, DeviceTypeID: dtid1} and a second policy 2 502 where the matchers and their values {matcher: values} are {Streaming Protocol: Dash, Country: US}, and thus each would be a level 2 node at maximum (because there are two sets of matchers and their values) in certain examples.

In certain examples, these two policies 501 and 502 are resolved for a request, but have conflicting instructions 1 and 2, so the manifest generation service is to pick the conflicting instruction 1 (instead of conflicting instruction 2) based on the below example sort order of matcher of (1) streaming protocol, (2) country, and (3) device type ID, because the device type ID is the "deepest" in that sort order.

In certain examples, this granularity is conveyed to the accumulator implicitly by arrangement of instructions produced post parsing of the hierarchical data structure (e.g., N-ary tree). This allows for (1) parsing the hierarchical data structure (e.g., N-ary tree) to get instructions and (2) the children of a node are arranged based on the granularity of matchers (e.g., categories). In certain examples, this (e.g., automatically) takes care of arranging all nodes at a given level in accordance to the matchers (e.g., categories).

Example of Building a Policy Tree

In certain examples, building a policy (e.g., N-ary) tree comprises initializing the policy tree with a root node, e.g., to attach any global policy that is not related to any matcher and is applicable for all the requests. In certain examples, building a policy (e.g., N-ary) tree comprises picking one policy at a time and adding it at a correct node in the tree, and continuing this until all the policies have been added to the tree. In certain examples, a new policy is added to the policy (e.g., N-ary) tree as a new node or an update to an existing node.

Resolving a Policy for a Given Manifest Request

In certain examples, an incoming manifest request with multiple matchers (e.g., parameters) is to match all the policies associated with all the combination(s) of matchers.

In certain examples, a request with the below matchers and matcher values:

```
{
StreamingProtocol - Dash
DeviceTypeId - ABCDEFGHIJKLMN
Country - US
}
```

should match the policies associated with these following combination of matcher values.

a. Dash
b. ABCDEFGHIJKLMN
c. US
d. Dash+ABCDEFGHIJKLMN
e. Dash+US
f. ABCDEFGHIJKLMN+US
g. Dash+ABCDEFGHIJKLMN+US So a request containing N matchers and values resolves to a maximum of 2ˆN policies in certain examples.

In certain examples, a second request with the below matchers and matcher values:

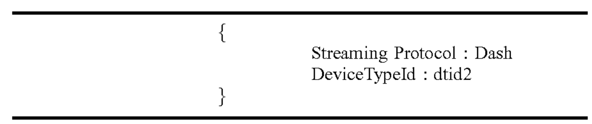

```
{
    Streaming Protocol : Dash
    DeviceTypeId : dtid2
}
```

matches all the instructions associated with the below matcher keys (as shown as selected nodes in FIG. 4):

(a) Dash at node 404→instructions1

(b) dtid2 at node 408→instructions5

(c) Dash+dtid2 at node 414→instructions3+instruction2

Time for Tree Traversal

In certain examples, based on the tree structure, the manifest generation service is to traverse all the children (e.g., sub-nodes that are below a certain node in a tree structure) of a matching node to find out next set of valid nodes. In certain examples, traversing all the nodes "n" of a valid node will have a time and space complexity (e.g., O(n) complexity) and then traversing the depth(d) of a tree which can be at maximum a total number of matchers possible (e.g., is constant). So an example worst case complexity will be O(n) where n is width of the tree.

Certain examples herein are directed to an improvement in tree structure to reduce the time complexity of a search. In reference to FIG. 4, the previous hierarchical data structure 124 (e.g., N-ary tree) remains intact but all the children of a node (e.g., matcher values) are grouped by their matcher (e.g., category). In certain examples, each group of matcher values for a particular matcher type (e.g., category) has its nodes stored in a map, e.g., Map<MatcherValue, Node>. Thus in certain examples, searching a node in any group is searching inside this map for MatcherValue which is O(1). In certain examples, to traverse the children of a node, the manifest generation services is to only go through all the group of matchers which is fixed and then get the node against a matcher value in constant time. So the complexity of this search is reduced to constant from linear in certain examples. An example of such an improved hierarchical data structure 124 (e.g., N-ary tree) is shown in FIG. 6, e.g., where children are now logically grouped to improve their searchability.

Figure 6:
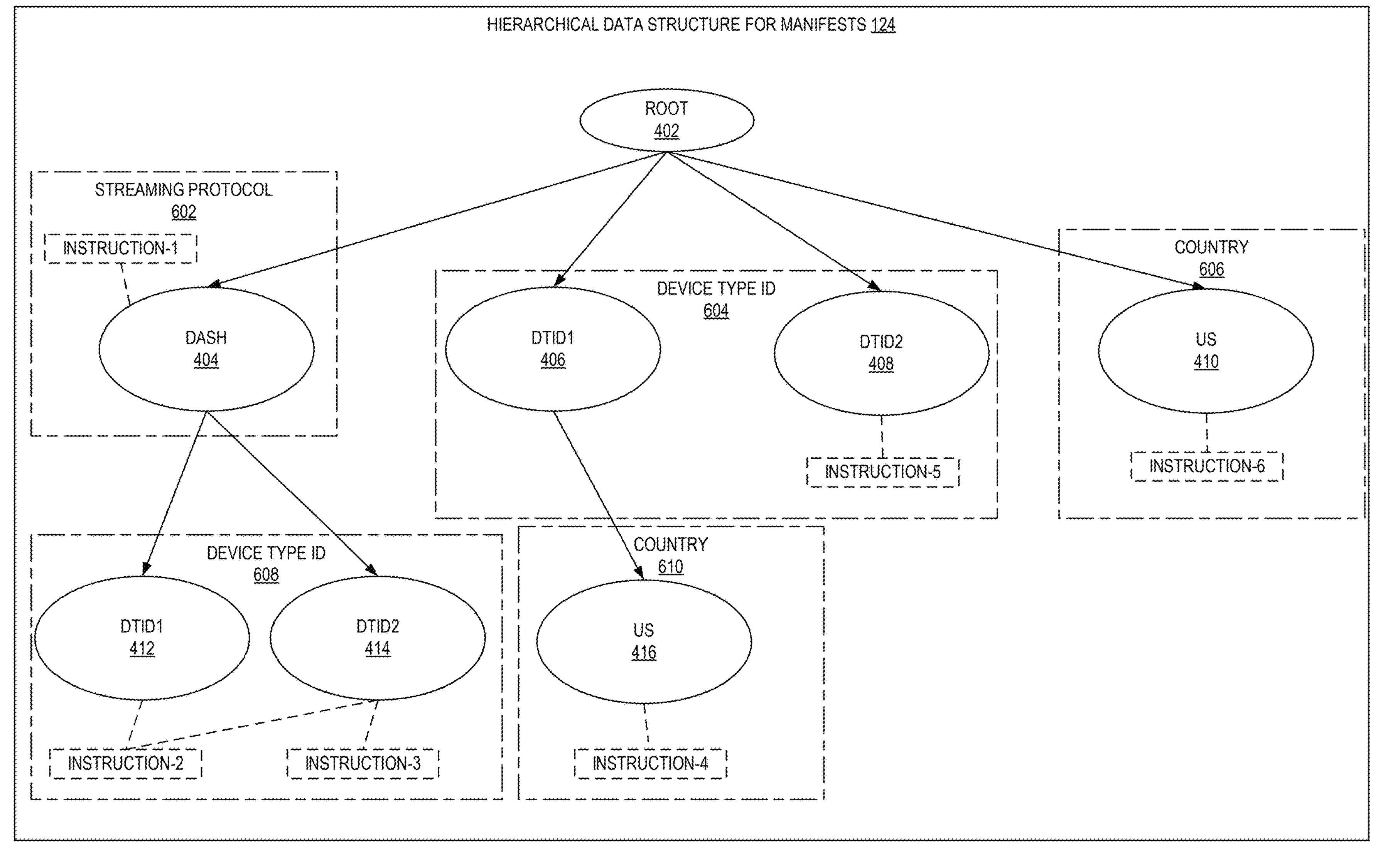
FIG. 6 is a diagram illustrating a hierarchical data structure for manifests with logical grouping of matchers (e.g., categories) according to some examples.

FIG. 6 is a diagram illustrating a hierarchical data structure 124 (e.g., N-ary tree) for manifests with logical grouping of matchers (e.g., categories) according to some examples. In certain examples, the logical grouping includes one or more of the following: the streaming protocol 602 type of matcher (which includes first level node 404), the device type ID 608 type of matcher (which includes child node 412 and child node 414 from parent node 404), the country 606 type of matcher (which includes first level node 410), the device type ID 604 type of matcher (which includes first level node 406 and node 408), and the country 610 type of matcher (which includes child node 416 from parent node 406).

Default Node

In certain examples, it is desirable to restrict a certain instruction(s) to a (e.g., small) subset of matcher values for a matcher and then a default instruction for all other matcher values. As an example, it may be desirable to restrict one particular Device TypeID (e.g., dtid1) to a certain bitrate cap "X" and then all other device Type IDs to bitrate cap "Y". Certain examples herein use the matcher type of "default" (e.g., keyword of "default") in a policy to signify that this is to match to all (e.g., other) possible values for a matcher (e.g., category).

Figure 7:
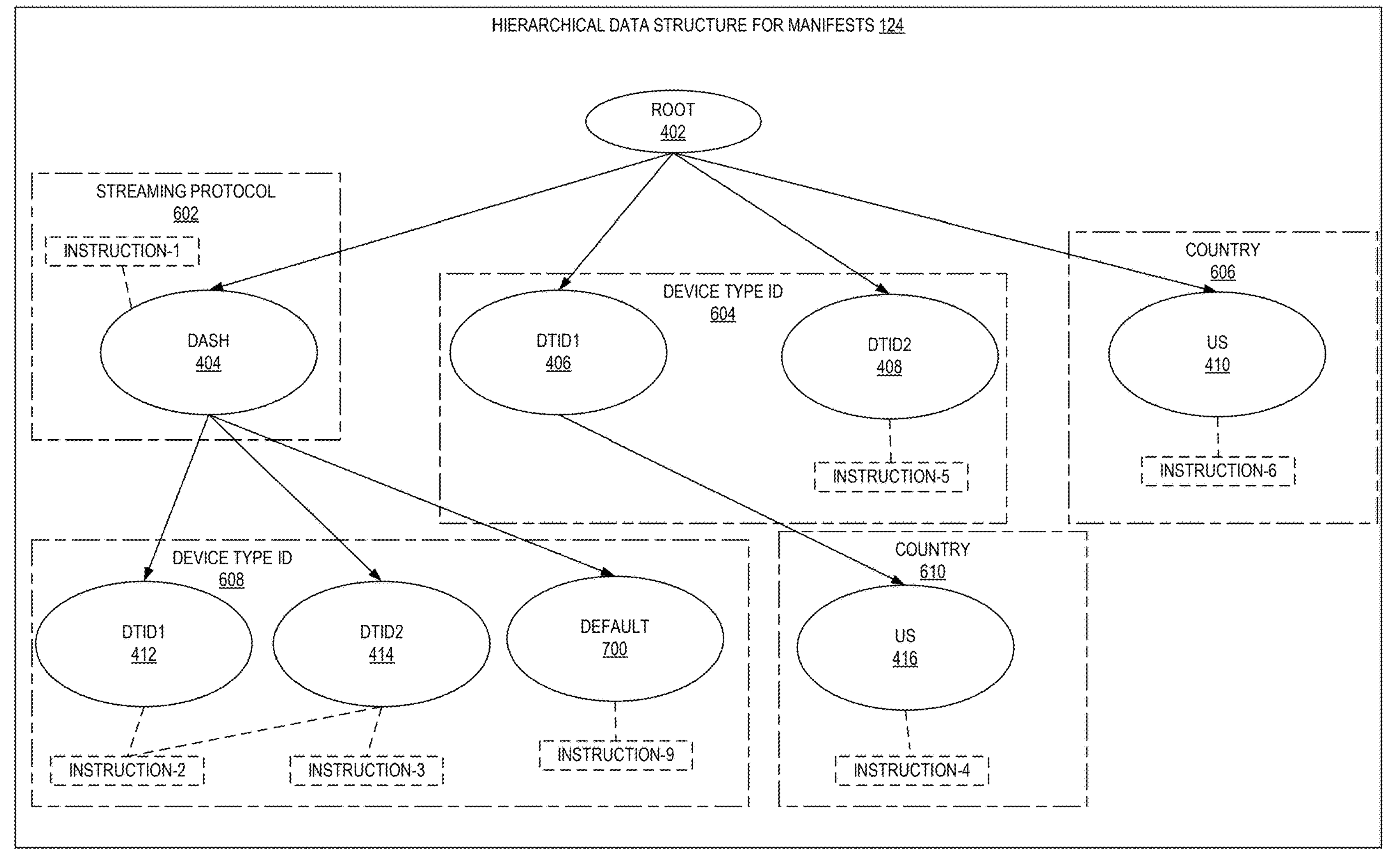
FIG. 7 is a diagram illustrating a hierarchical data structure for manifests with a default node according to some examples.

FIG. 7 is a diagram illustrating a hierarchical data structure 124 for manifests with a default node 700 according to some examples.

So adding a policy like the below in the hierarchical data structure 124 (e.g., N-ary tree) is:

```
Matchers {
   Streaming Protocol: Dash
   DeviceTypeID: default
}
Instruction {
   instruction-9
}
```

Example Pseudocode

In the following "italics" are used for comments.

```
class Node {
   Example: dtid2, Dash, US etc.
   matcherValue : String;
   Logical grouping of children nodes against matcher
   matcherNodes : List
   Instructions from all the matching policy for a node
   instructions: List<Instruction>
}
class MatcherNode {
   String literals like StreamingProtocol, DeviceTypeID, Country
   matcher : String
   {'Dash': node1, 'HLS': node2, 'dtid1': node3}
   nodes : Map<MatcherValue, Node>
}
class Pair {
   matcher : String
   matcherValue : String
}
Tree creation
class PolicyTree {
   val root Node
   Adds instructions to the right node in Tree
   pair is Matcher: MatcherValue like StreamingTechnology: Dash.
   fun addElementsToPath(instructions: List<Instruction>, path: List<Pair> ) {
      sort the path based on our predefined sorted order of matchers
      val sortedPath = path.sortBy { pair → Matcher.valueOf(pair.matcher).ordinal }
      var Node node = root
      Loop through the path starting with root node to find out right position for the
      instructions to be added
      for (element in sortedPath) {
         Check if matcherGroup for the matcher in path already exist at ckurrent
         node
         matcherNode = node.matcherNodes.find { matcherNode →
         matcherNode.matcher ==
         element.matcher }
         if (matcherNode != null ) {
            If matcherGroup already exist then check if node exist and if not
            create one
            node = matcherNode.nodes.getOrPut(element.matcherValue) {
            new
            Node(listOf( ), listOf( )) }
         else {
         If matcherGroup does not exist then create one and then create an
         associated node
            node = new Node(listOf( ))
            matcherNode          =          node.matcherNodes.add(new
            MatcherNode(element.matcher,
               mutableMapOf(element.matcherValue to node))
         }
      }
      At the end add the instructions to the node
      node.instructions.addAll(instructions)
   }
   Get the list of instructions applicable for the given matcher
   fun getElementsforMatchers(matchers: List<Pair> ) : List<Instruction> {
      val queue: Queue<TreeNode> = LinkedList( )
      queue.add(root)
   To collect all the matching instructions
   val instructions = mutableListOf( )
```

-continued

```
  Loop through until there are no node to be looked into
  while (queue.isNotEmpty( )) {
    val node = queue.poll( )
    instructions.addAll(node.instructions)
    Loop through all the matcher groups to identify nodes related to
    matcherValue in request
    for (matcherNode : node.matcherNodes) {
      Find the (matcher : matcherValue) pair from request for this specifc
      matcher Node group
      currentPair = matchers.find { requestMatcher →
      requestMatcher.matcher
      == matcherNode.matcher
      Get the node specific to the matcherValue resolved in above step and
      this will be one of the valid node to get instructions from
      currentPair?.let {
        currentNode                                    =
        matcherNode.nodes.get(currentPair.matcherValue)
        currentNode?.let { queue.add(currentNode) }
      }
    }
  }
  return instructions
}
  Enum class to impose the ordering of matcher
  enum class Matcher {
    StreamingTech,
    DeviceTypeId,
    Country
  }
}
```

Accumulation

In certain examples, a manifest generation service is provided information about a customer, device, and asset to produce an instruction list (e.g., set) which (e.g., when provided in addition to some other pass through information provided from upstream), generates the manifest, e.g., or generates an indication of the instructions that is used by a service vending manifests to clients (e.g., dynamic manifest service and/or stream manipulation service (SMS)). In certain examples, a cache key or protocol buffer (protobuf) provides this instruction set which is then used.

In certain examples, a global configuration is overloaded with numerous policies that have repeated instructions. Instead, certain examples herein utilize a hierarchical data structure (e.g., N-ary tree) that uses a hierarchy of nodes, e.g., and utilizes a deepest (e.g., lowest level) of node (e.g., instead of merely using the first found matcher in a global configuration). In certain examples, a request of the hierarchical data structure (e.g., policy tree) can match multiple policies in the tree thus resulting in having multiple instructions of the same type (e.g., multiple DRM key instructions). This can produce unexpected behavior for a manifest generation service. Certain examples herein solve this technical problem by merging the same type instructions, e.g., using the rules discussed herein. In certain examples, the accumulation (e.g., "accumulator") is not responsible for validating the instruction list as a whole. For example, the accumulation (e.g., "accumulator") can produce the following contradicting result:

BitrateBlocklist: [100]

BitrateAllowlist: [100]

Certain examples herein allow this as a valid result from the accumulation of the instructions, e.g., but separate responsibilities of (i) the accumulation and (ii) the validation (e.g., merging) of the instructions accumulated for a manifest request.

Certain examples herein are directed to a manifest generation service (e.g., the rules implemented by the manifest generation service) for merging and/or identifying what to do when instructions are conflicting. Certain examples herein are directed to a manifest generation service (e.g., the rules implemented by the manifest generation service) to: (1) define the expectation from policy tree matching, (2) define mergeable and not mergeable instructions, (3) produce multiple instructions that can be converted into an instruction list, and/or (4) allow each instruction to be responsible for its own merging and not depend on other instructions.

A manifest request may result in multiple instructions being applicable, but a set of two or more of those instructions may conflict (e.g., are mutually exclusive) and/or overlap with each other. Some instructions (e.g., the operand values indicated by the instruction) can be mergeable, but others can contradict (for example, and a rule can specify which contradicting instruction to select, e.g., the more granular one in certain examples).

Figure 8:
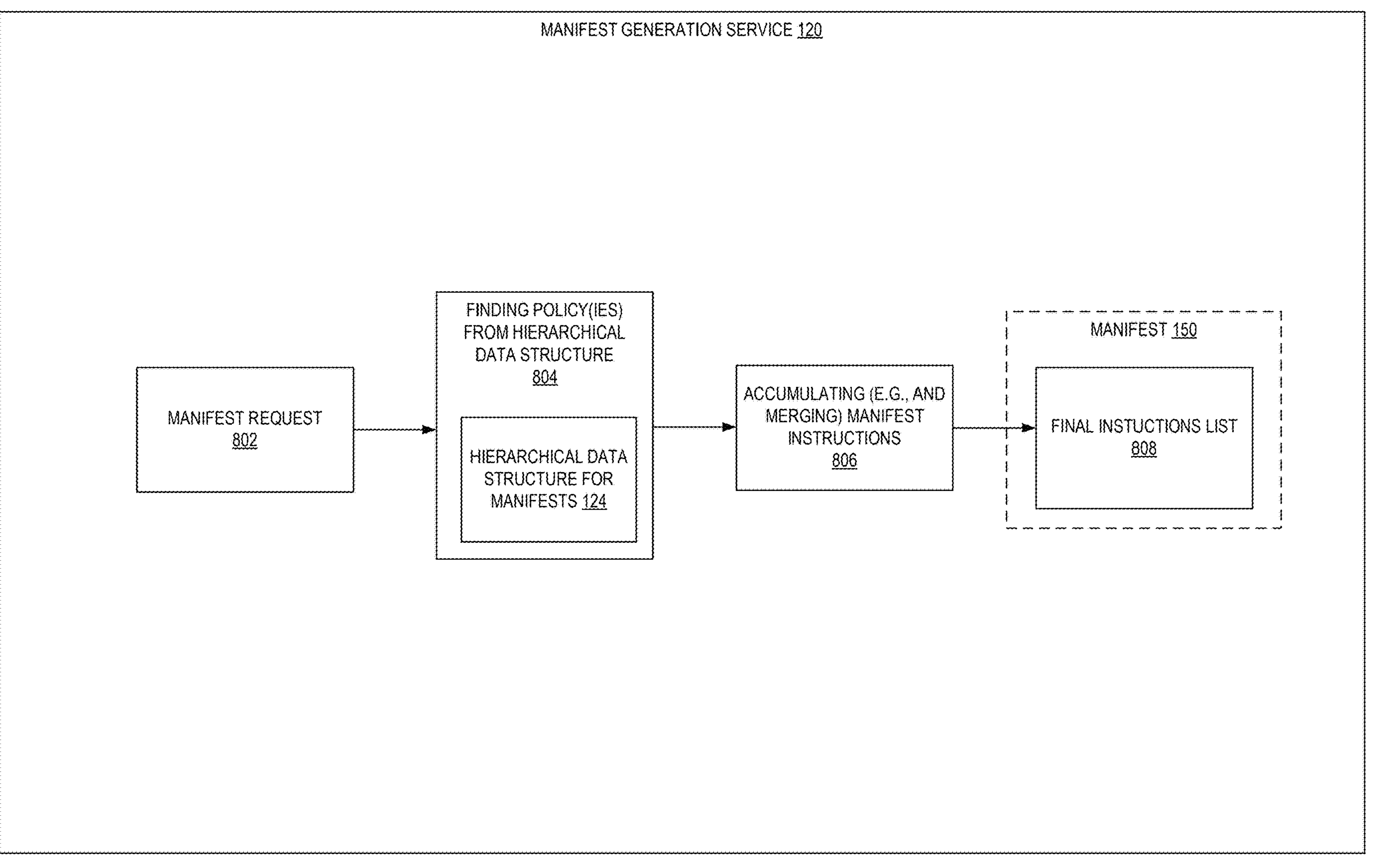
FIG. 8 is a diagram illustrating example components of a manifest generation service according to some examples.

FIG. 8 is a diagram illustrating example components of a manifest generation service according to some examples. Depicted components in FIG. 8 include a manifest request 802 (e.g., indicating one or more manifest request parameters), finding policy(ies) at 804 from the hierarchical data structure 124 for manifests (e.g., finding the instruction(s) from the corresponding nodes based on the match of a node to a matcher value from the manifest request), accumulating (e.g., and merging) at 806 the manifest instructions that are found, and generating a final instruction list at 808. In certain examples, the final instruction list is used to generate the manifest 150 (e.g., from the origin manifest 126). In certain examples, the order of the instructions matters, e.g., the order (e.g., depth of node) specifies which contradicting instruction to select (e.g., and then apply that instruction to the origin manifest 126 to generate manifest 150). In certain examples, the policy hierarchical data structure (e.g., policy tree) passes user arguments that comes from request. In certain examples, user argument instructions will have higher priority than an instruction on the tree, e.g., and these user instructions will override the same type (e.g., same matcher category) of instructions inside the policy.

In certain examples, the accumulation at 806 is to iterate through all the policies that are passed by policy tree and produce an instruction list. In certain examples, the merging (e.g., according to the rules discussed herein) at 806 is to generate a merged instructions list, e.g., and the merged instructions list is used to generate the manifest. In certain examples, the merged instruction list will not contain any duplicate instruction type (e.g., it does not include two different DRM Key instructions of Dual Key and Single key). In certain examples, each instruction can be merged differently.

Figure 9:
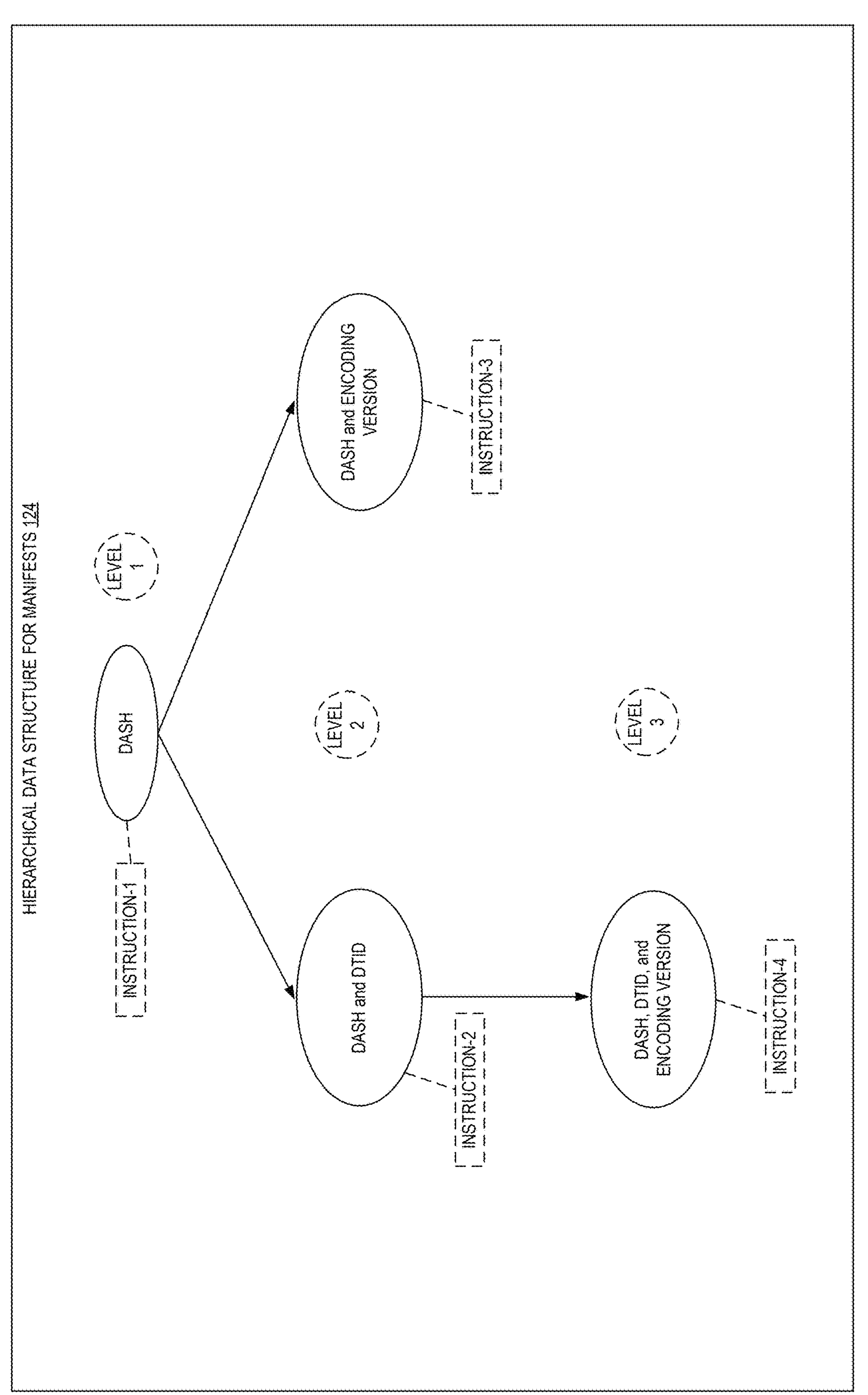
FIG. 9 is a diagram illustrating another hierarchical data structure for manifests according to some examples.

FIG. 9 is a diagram illustrating another hierarchical data structure 124 (e.g., policy tree) for manifests according to some examples. In certain examples, the manifest generation service is to traverse the hierarchical data structure 124 (e.g., policy tree) for a manifest request. In certain examples, the resulting instructions list has more granular policies at the end of the tree path. Policies that are located at the same level (e.g., level 2 in FIG. 9) have the same granularity as order of matchers in the policy tree. In certain examples, the expected output of the hierarchical data structure 124 (e.g., policy tree) is instruction 1, instruction 2, instruction 3, and instruction 4.

For example: if the order of matchers in policy tree 1. manifest_type (enum)
2. DTID (string with regex)
3. playbackMode (enum)
4. geoipCountry (enum)
5. encodingMajorVersion (uint)
6. assetBitrateAdaptation (enum)
7. cdn (enum)
8. player(enum)

the policies that appear later in the matchers list will be more granular in certain examples, e.g., encodingMajorVersion will override instructions that appear in DTID. Thus a plurality of policies that apply but conflict and/or overlap are resolved in real time in certain examples.

Rules for Merging Instructions

In certain examples, instructions can be:

1: merged, e.g., information combined from both instructions to produce a new one, or 2. the more granular instruction is selected, for example, the deeper instruction in the tree wins the merging, e.g., the deeper instruction in the tree will be applied and would overwrite other ones.

Examples of these rules are specified below.

Merging

Audio Bitrate Allowlist, Audio Bitrate Blocklist, Dolby Atmos Blocklist, Video Bitrate Allow list, Video Bitrate Block list, and Dolby Audio Channel Filter matcher types can be merged by combining distinct matcher values. For example,

```
{
"type": "AudioBitrateAllowlist",
"list": [1000000, 1300000, 2400000, 2990000]
}
```

In certain examples, the matcher values (e.g., operands) of these instructions are listed as a parameter inside the instruction. Certain examples herein take all distinct values (e.g., non-contradicting and differing range) from both instructions and merge them. An example is

```
{
"type": "AudioBitrateAllowlist",
"list": [1000000, 1300000, 2400000, 2990000]
},
{
"type": "AudioBitrateAllowlist",
"list": [1000000, 1500000]
},
// merged result
{
"type": "AudioBitrateAllowlist",
"list": [1000000, 1500000, 2400000, 2990000]
},
```

Audio Bitrate Ceiling, Video Bitrate Ceiling, and Video Resolution Ceiling matcher types can be merged by selecting a ceiling (e.g., lowest) from the (e.g., overlapping) matcher values. For example,

```
}
"type": "InstructionCeiling",
"bitrate": 150000 # Uint
},
```

In certain examples, a ceiling will block all bitrates above the specified ceiling (or maximum) of bitrate allowed, and thus the lowest matcher value is selected as the ceiling. An example is:

```
{
"type": "InstructionCeiling1",
"bitrate": 100 # Uint
},
{
"type": "InstructionCeiling2",
"bitrate": 500 # Uint
},
// merged result
{
"type": "InstructionCeilingResult",
"bitrate": 100 # Uint
},
```

Another example is:

```
{
"type": "VideoResolutionCeiling",
"height": 1080,
"width": 1216
},
{
"type": "VideoResolutionCeiling",
"height": 684,
"width": 1920
},
// merged result
{
"type": "VideoResolutionCeiling",
"height": 684,
"width": 1216
},
```

In certain examples, a resolution ceiling can be split into a height ceiling and a width ceiling, e.g., taking the lowest one for each of the heigh ceiling and the width ceiling.

Audio Bitrate Floor, Video Bitrate Floor, and Video Resolution Floor matcher types can be merged by selecting a floor (e.g., highest) from the (e.g., overlapping) matcher values. Example,

```
{
"type": "InstructionFloor",
"bitrate": 150000 # Uint
},
```

In certain examples, a floor will block all bitrates below the specified floor (or minimum) of bitrate allowed, and thus the highest matcher value is selected as the floor. An example is:

```
{
"type": "InstructionFloor1",
"bitrate": 100 # Uint
},
{
"type": "InstructionFloor2",
"bitrate": 500 # Uint
},
```

-continued

```
// merged result
{
"type": "InstructionFloor",
"bitrate": 500 # Uint
},
```

Another example is:

```
{
"type": "VideoResolutionFloor",
"height": 1080,
"width": 1216
},
{
"type": "VideoResolutionFloor",
"height": 684,
"width": 1920
},
// merged result
{
"type": "VideoResolutionFloor",
"height": 1080,
"width": 1920
},
```

In certain examples, a resolution floor can be split into a height floor and a width floor, e.g., taking the highest one for each of the heigh floor and the width floor.

Remove Anamorphic Content and Remove Dolby Atmos matcher types do not have any parameters and have only one state, e.g., so they can be merged by combining them together in certain examples.

In certain examples, the more granular instruction is selected when there is a conflict (e.g., when the instructions contradict).

For example, for a DRM shared video and audio key:

```
{
"type": "drmShared VideoAudioKey",
"keyMode": "SINGLE_KEY" # OR "DUAL_KEY" enum
},
```

Certain examples herein pick the more granular one, e.g., the one from the deepest node in the tree.

In certain examples, a policy tree is to accumulate the following instructions for a manifest request:

DrmSharedVideoAudioKey(SINGLE),
VideoBitrateBlocklist[100, 200]
VideoBitrateBlocklist[100, 500]
DrmSharedVideoAudioKey(DOUBLE)

In certain examples, the instruction accumulator will accumulate these instructions to produce the following map:

DrmSharedVideoAudioKey→[DrmSharedVideoAudioKey(Single), DrmSharedVideoAudioKey(Double)]
VideoBitrateBlocklist→VideoBitrateBlocklist[100, 200], VideoBitrateBlocklist[100, 500]

In certain examples, merging (e.g., reduce/fold) is performed on each value of map:

```
[DrmSharedVideoAudioKey(Single), DrmSharedVideoAudioKey(Double)].reduce
   -> DrmSharedVideoAudioKey(Double) //as more granular wins
VideoBitrateBlocklist[100, 200], VideoBitrateBlocklist[100, 500].reduce
   -> VideoBitrateBlocklist[100, 200, 500] //as there is overlap
Result of getCollapsedResult :
  DrmSharedVideoAudioKey(Double), VideoBitrateBlocklist[100, 200, 500] //output of
  a merged instruction list.
```

Figure 10:
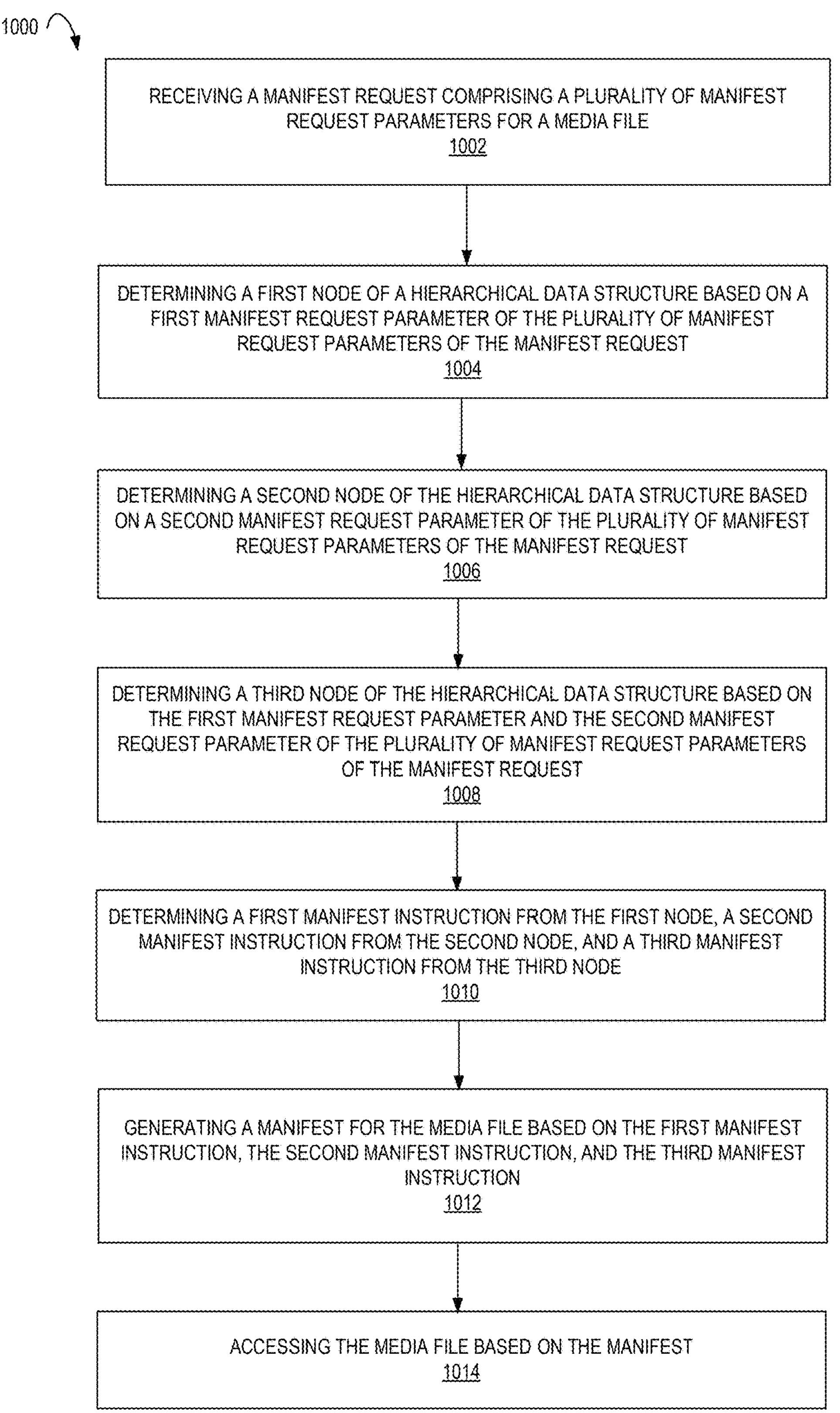
FIG. 10 is a flow diagram illustrating operations of a method of generating a manifest for a media file according to some examples.

FIG. 10 is a flow diagram illustrating operations 1000 of a method of generating a manifest for a media file according to some examples. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1000 are performed by a manifest generation service 120 of the other figures.

The operations 1000 include, at block 1002, receiving a manifest request comprising a plurality of manifest request parameters for a media file. The operations 1000 further include, at block 1004, determining a first node of a hierarchical data structure based on a first manifest request parameter of the plurality of manifest request parameters of the manifest request. The operations 1000 further include, at block 1006, determining a second node of the hierarchical data structure based on a second manifest request parameter of the plurality of manifest request parameters of the manifest request. The operations 1000 further include, at block 1008, determining a third node of the hierarchical data structure based on the first manifest request parameter and the second manifest request parameter of the plurality of manifest request parameters of the manifest request. The operations 1000 further include, at block 1010, determining a first manifest instruction from the first node, a second manifest instruction from the second node, and a third manifest instruction from the third node. The operations 1000 further include, at block 1012, generating a manifest for the media file based on the first manifest instruction, the second manifest instruction, and the third manifest instruction. The operations 1000 further include, at block 1014, accessing the media file based on the manifest.

At least some examples of the disclosed technologies can be described in view of the following examples:

Example 1. A computer-implemented method comprising:

receiving, at a content delivery service from a media player device, a manifest request comprising a plurality of manifest request parameters for a media file;

determining, by the content delivery service, a first node of a tree data structure based on a first manifest request parameter of the plurality of manifest request parameters of the manifest request;

determining, by the content delivery service, a second node of the tree data structure based on a second manifest request parameter of the plurality of manifest request parameters of the manifest request;

determining, by the content delivery service, a third node of the tree data structure based on the first manifest request parameter and the second manifest request parameter of the plurality of manifest request parameters of the manifest request;

determining, by the content delivery service, a first manifest instruction from the first node, a second manifest instruction from the second node, and a third manifest instruction from the third node;

generating, by the content delivery service, a manifest for the media file based on the first manifest instruction, the second manifest instruction, and the third manifest instruction; and sending, by the content delivery service, the manifest to the media player device.

Example 2. The computer-implemented method of example 1, wherein the generating the manifest comprises:

determining, by the content delivery service, that two or more of the first manifest instruction, the second manifest instruction, and the third manifest instruction are contradicting; and selecting, by the content delivery service, one manifest instruction of the two or more of the first manifest instruction, the second manifest instruction, and the third manifest instruction based on corresponding positions (e.g., level of the hierarchy) of the first node, the second node, and the third node in the tree data structure, wherein the generating the manifest is based on the one manifest instruction.

Example 3. The computer-implemented method of example 1, wherein the generating the manifest comprises:

determining, by the content delivery service, that two or more of the first manifest instruction, the second manifest instruction, and the third manifest instruction have a non-contradicting and differing range; and combining, by the content delivery service, the two or more of the first manifest instruction, the second manifest instruction, and the third manifest instruction based on the non-contradicting and differing range into a single manifest instruction, wherein the generating the manifest is based on the single manifest instruction.

Example 4. A computer-implemented method comprising:

receiving a manifest request comprising a plurality of manifest request parameters for a media file;

determining a first node of a hierarchical data structure based on a first manifest request parameter of the plurality of manifest request parameters of the manifest request;

determining a second node of the hierarchical data structure based on a second manifest request parameter of the plurality of manifest request parameters of the manifest request;

determining a third node of the hierarchical data structure based on the first manifest request parameter and the second manifest request parameter of the plurality of manifest request parameters of the manifest request;

determining a first manifest instruction from the first node, a second manifest instruction from the second node, and a third manifest instruction from the third node;

generating a manifest for the media file based on the first manifest instruction, the second manifest instruction, and the third manifest instruction; and accessing the media file based on the manifest.

Example 5. The computer-implemented method of example 4, wherein the generating the manifest comprises:

determining that two or more of the first manifest instruction, the second manifest instruction, and the third manifest instruction are contradicting; and selecting one manifest instruction of the two or more of the first manifest instruction, the second manifest instruction, and the third manifest instruction based on corresponding positions of the first node, the second node, and the third node in the hierarchical data structure, wherein the generating the manifest is based on the one manifest instruction.

Example 6. The computer-implemented method of example 5, wherein the hierarchical data structure is a tree data structure of manifest request parameters, and the selecting the one manifest instruction based on the corresponding positions comprises determining a deepest node of the first node, the second node, and the third node in the tree data structure of manifest request parameters, and selecting a corresponding manifest instruction from the deepest node as the one manifest instruction.

Example 7. The computer-implemented method of example 5, wherein the two or more of the first manifest instruction, the second manifest instruction, and the third manifest instruction that are contradicting comprise one manifest instruction for a single key digital rights management instruction and another manifest instruction for a dual key digital rights management instruction.

Example 8. The computer-implemented method of example 4, wherein the receiving is at a content delivery service and the manifest request is from a media player device, and the computer-implement method further comprises:

determining an additional parameter for the request by the content delivery service;

determining a fourth node of the hierarchical data structure based on the additional parameter; and determining a fourth manifest instruction from the fourth node, wherein the generating the manifest is also based on the fourth manifest instruction.

Example 9. The computer-implemented method of example 4, wherein the generating the manifest comprises:

determining that two or more of the first manifest instruction, the second manifest instruction, and the third manifest instruction have an overlap; and combining the two or more of the first manifest instruction, the second manifest instruction, and the third manifest instruction based on the overlap into a single manifest instruction, wherein the generating the manifest is based on the single manifest instruction.

Example 10. The computer-implemented method of example 9, wherein the combining is according to a first merging policy for a first type of manifest instructions, and a second merging policy for a second type of manifest instructions.

Example 11. The computer-implemented method of example 10, wherein the first merging policy is selecting a maximum value from a plurality of overlapping values within the first type of manifest instructions.

Example 12. The computer-implemented method of example 11, wherein the second merging policy is selecting a minimum value from a plurality of overlapping values within the second type of manifest instructions.

Example 13. The computer-implemented method of example 10, wherein the second merging policy is selecting a minimum value from a plurality of overlapping values within the second type of manifest instructions.

Example 14. The computer-implemented method of example 4, further comprising generating the first node of the hierarchical data structure based on receipt of the first manifest request parameter.

Example 15. A non-transitory computer-readable medium storing code that, when executed by a device, causes the device to perform a method comprising:

receiving a manifest request comprising a plurality of manifest request parameters for a media file;

determining a first node of a hierarchical data structure based on a first manifest request parameter of the plurality of manifest request parameters of the manifest request;

determining a second node of the hierarchical data structure based on a second manifest request parameter of the plurality of manifest request parameters of the manifest request;

determining a third node of the hierarchical data structure based on the first manifest request parameter and the second manifest request parameter of the plurality of manifest request parameters of the manifest request;

determining a first manifest instruction from the first node, a second manifest instruction from the second node, and a third manifest instruction from the third node;

generating a manifest for the media file based on the first manifest instruction, the second manifest instruction, and the third manifest instruction; and accessing the media file based on the manifest.

Example 16. The non-transitory computer-readable medium of example 15, wherein the generating the manifest comprises:

determining that two or more of the first manifest instruction, the second manifest instruction, and the third manifest instruction are contradicting; and selecting one manifest instruction of the two or more of the first manifest instruction, the second manifest instruction, and the third manifest instruction based on corresponding positions of the first node, the second node, and the third node in the hierarchical data structure, wherein the generating the manifest is based on the one manifest instruction.

Example 17. The non-transitory computer-readable medium of example 16, wherein the hierarchical data structure is a tree data structure of manifest request parameters, and the selecting the one manifest instruction based on the corresponding positions comprises determining a deepest node of the first node, the second node, and the third node in the tree data structure of manifest request parameters, and selecting a corresponding manifest instruction from the deepest node as the one manifest instruction.

Example 18. The non-transitory computer-readable medium of example 15, wherein the receiving is at a content delivery service and the manifest request is from a media player device, and the method further comprises:

determining an additional parameter for the request by the content delivery service;

determining a fourth node of the hierarchical data structure based on the additional parameter; and determining a fourth manifest instruction from the fourth node, wherein the generating the manifest is also based on the fourth manifest instruction.

Example 19. The non-transitory computer-readable medium of example 15, wherein the generating the manifest comprises:

determining that two or more of the first manifest instruction, the second manifest instruction, and the third manifest instruction have an overlap; and combining the two or more of the first manifest instruction, the second manifest instruction, and the third manifest instruction based on the overlap into a single manifest instruction, wherein the generating the manifest is based on the single manifest instruction.

Example 20. The non-transitory computer-readable medium of example 19, wherein the combining is according to a first merging policy for a first type of manifest instructions, and a second merging policy for a second type of manifest instructions.

Exemplary environments, systems, etc. that the above may be used in are detailed below.

Figure 11:
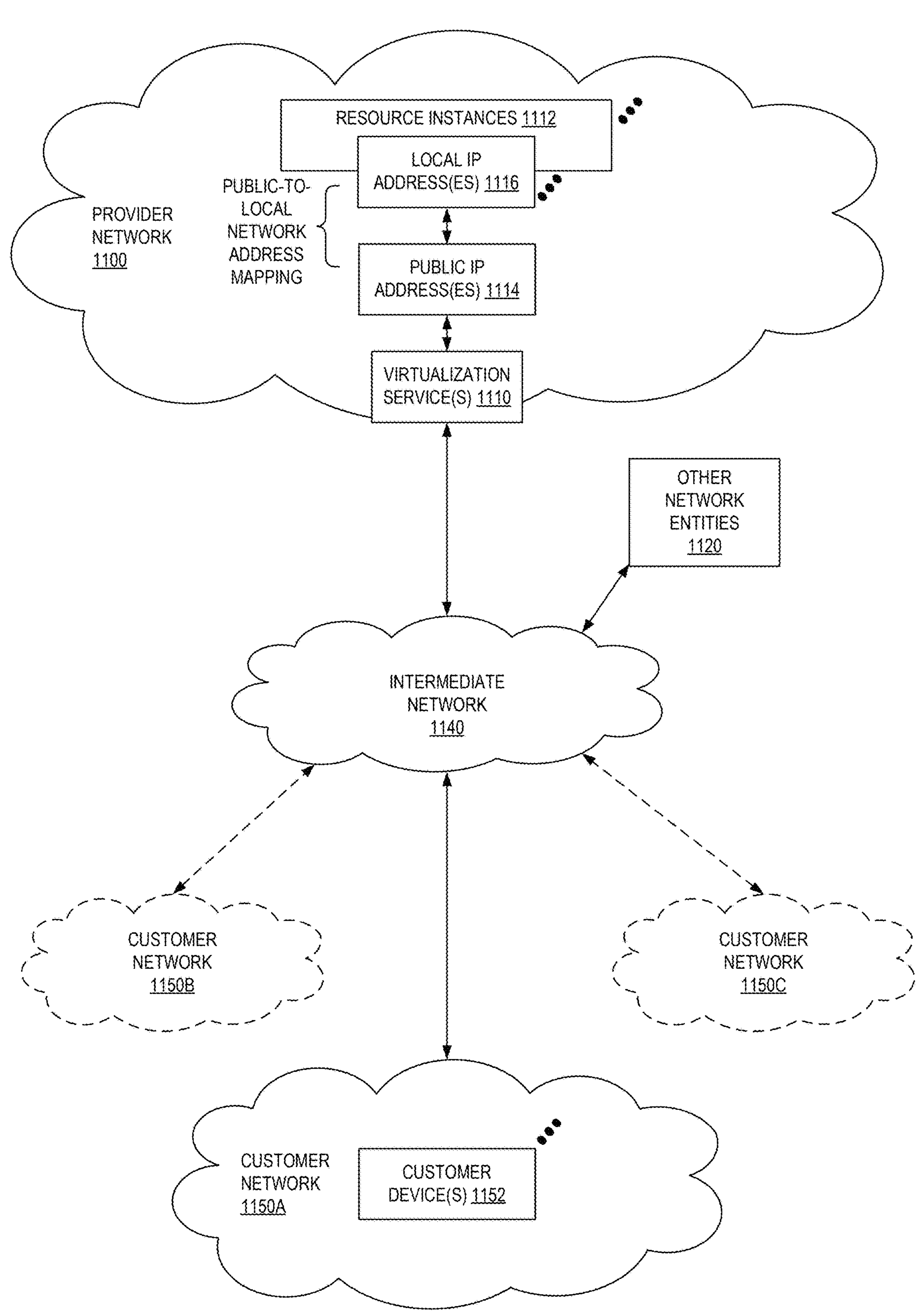
FIG. 11 illustrates an example provider network environment according to some examples.

FIG. 11 illustrates an example provider network (or "service provider system") environment according to some examples. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some examples, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
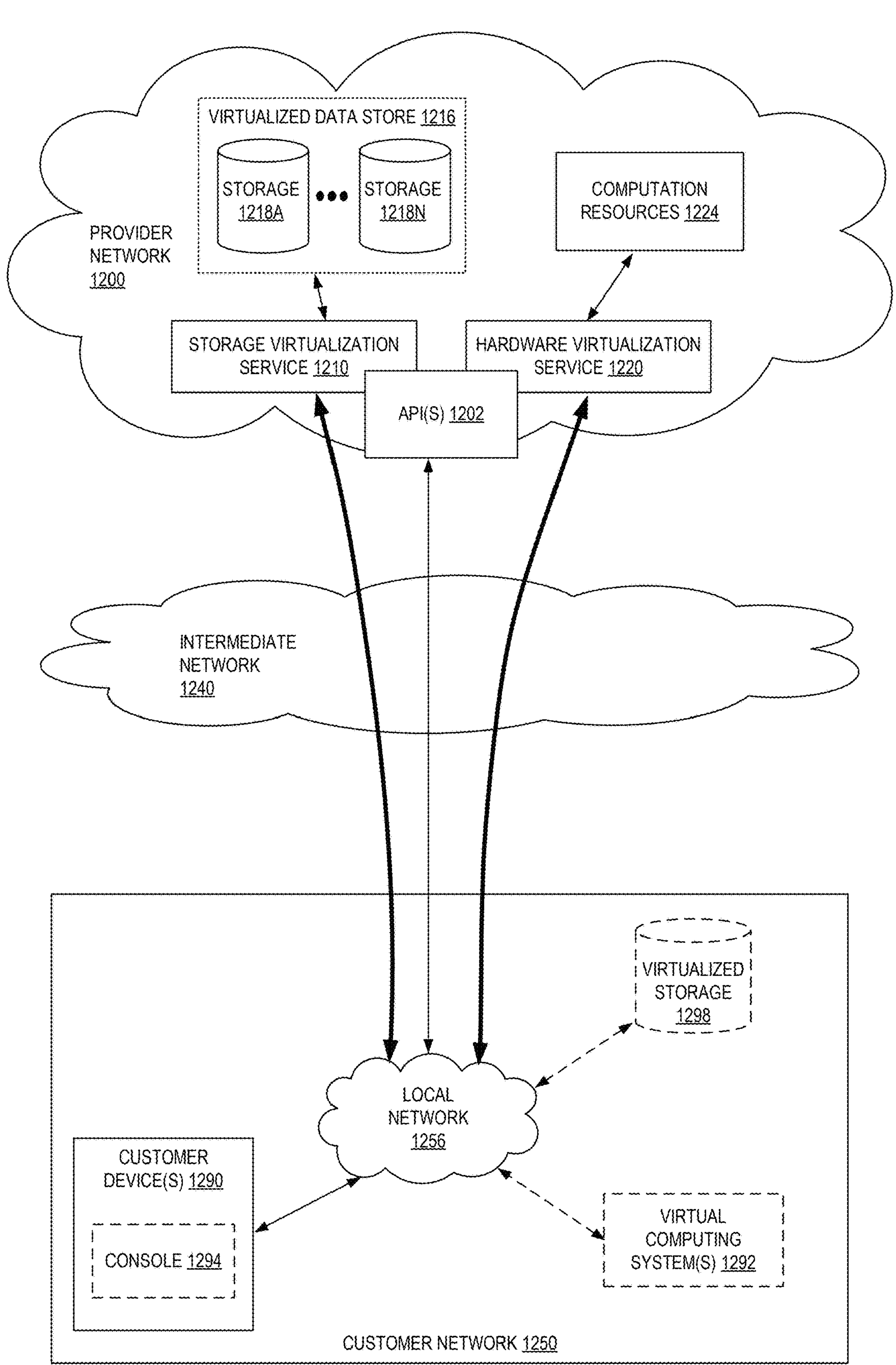
FIG. 12 is a block diagram of an example provider network that provides a storage service and a hardware virtualization service to customers according to some examples.

FIG. 12 is a block diagram of an example provider network that provides a storage service and a hardware virtualization service to customers, according to some examples. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some examples, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some examples, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some examples, a virtualized data store gateway (not shown) may be provided at the customer network 1250 that may locally cache at least some data, for example frequently accessed or critical data, and that may communicate with storage service 1210 via one or more communications channels to upload new or modified data from a local cache so that the primary store of data (virtualized data store 1216) is maintained. In some examples, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative System

Figure 13:
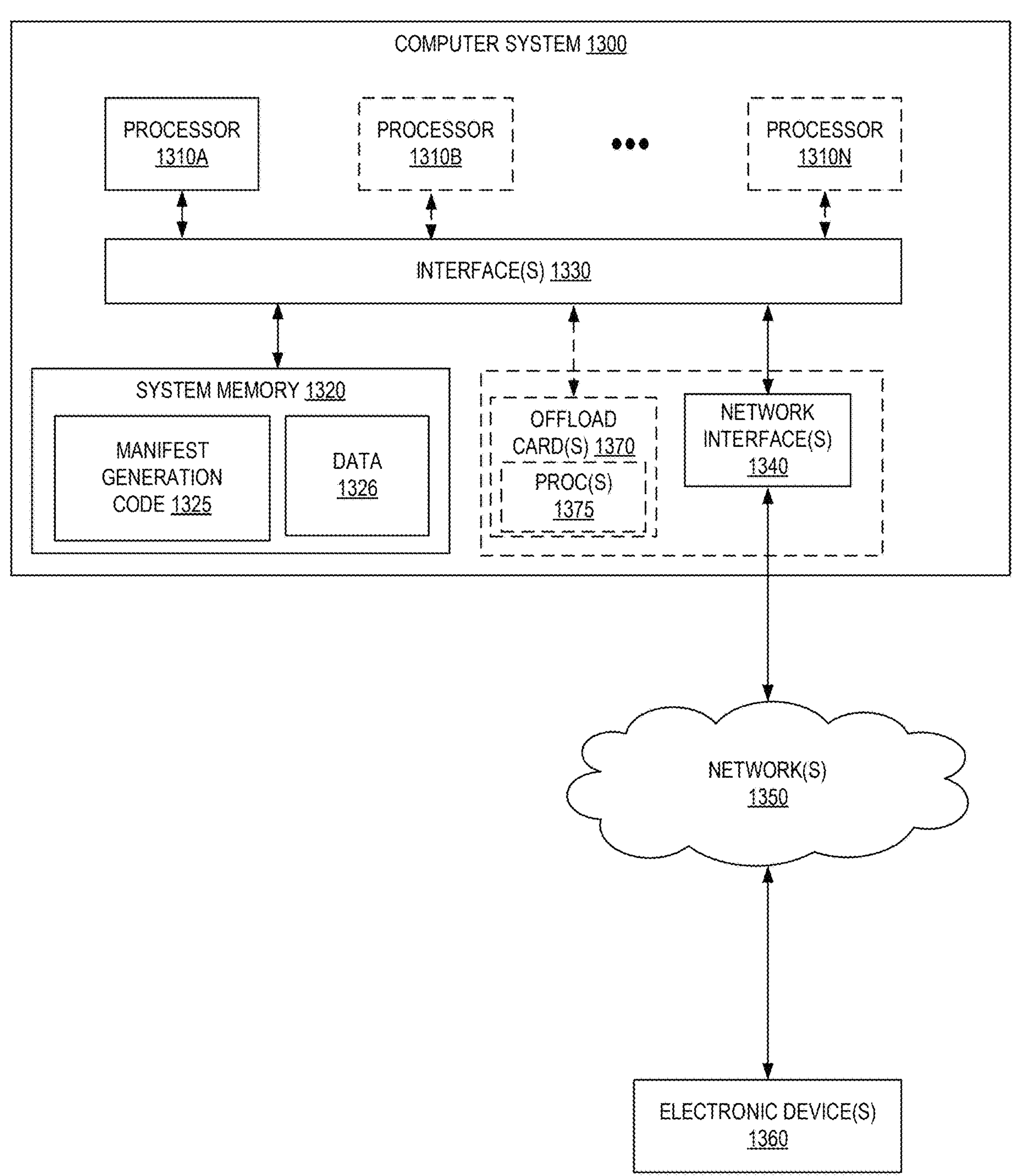
FIG. 13 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1300 illustrated in FIG. 13. In the illustrated example, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various examples a computer system 1300 may include one computing device or any number of computing devices configured to work together as a single computer system 1300.

In various examples, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various examples, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various examples, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1320 as manifest generation code 1325 (e.g., executable to implement, in whole or in part, the (e.g., manifest generation service 120) operations discussed herein) and data 1326.

In one example, I/O interface 1330 may be configured to coordinate I/O traffic between processor 1310, system memory 1320, and any peripheral devices in the device, including network interface 1340 or other peripheral interfaces. In some examples, I/O interface 1330 may perform any necessary protocol, timing, or other data transformations to convert data signals from one component (e.g., system memory 1320) into a format suitable for use by another component (e.g., processor 1310). In some examples, I/O interface 1330 may include support for devices attached through various types of peripheral buses, such as a variant of the Peripheral Component Interconnect (PCI) bus standard or the Universal Serial Bus (USB) standard, for example. In some examples, the function of I/O interface 1330 may be split into two or more separate components, such as a north bridge and a south bridge, for example. Also, in some examples some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various examples, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some examples the offload card(s) 1370 can perform compute instance management operations such as pausing and/or un-pausing compute instances, launching and/or terminating compute instances, performing memory transfer/copying operations, etc. These management operations may, in some examples, be performed by the offload card(s) 1370 in coordination with a hypervisor (e.g., upon a request from a hypervisor) that is executed by the other processors 1310A-1310N of the computer system 1300. However, in some examples the virtualization manager implemented by the offload card(s) 1370 can accommodate requests from other entities (e.g., from compute instances themselves), and may not coordinate with (or service) any separate hypervisor.

In some examples, system memory 1320 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
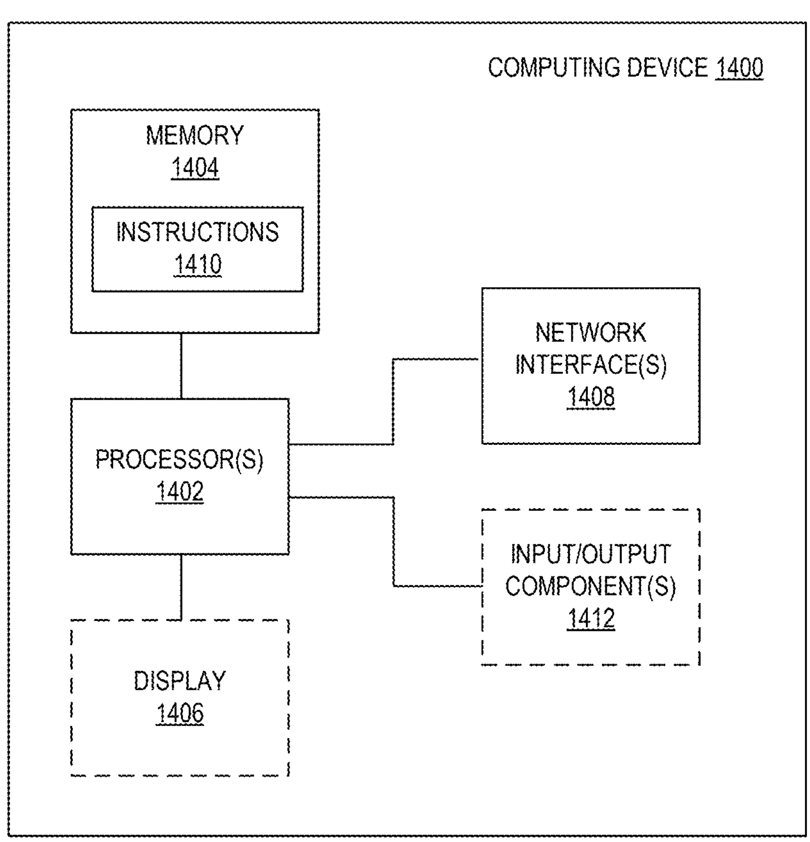
FIG. 14 illustrates a logical arrangement of a set of general components of an exemplary computing device that can be utilized in accordance with various examples.

FIG. 14 illustrates a logical arrangement of a set of general components of an example computing device 1400. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (for example, instructions 1410, e.g., which implement a content delivery service as disclosed herein), and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1410) for execution on the set of one or more processors 1402 of that electronic device. One or more parts of various examples may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some examples include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 15:
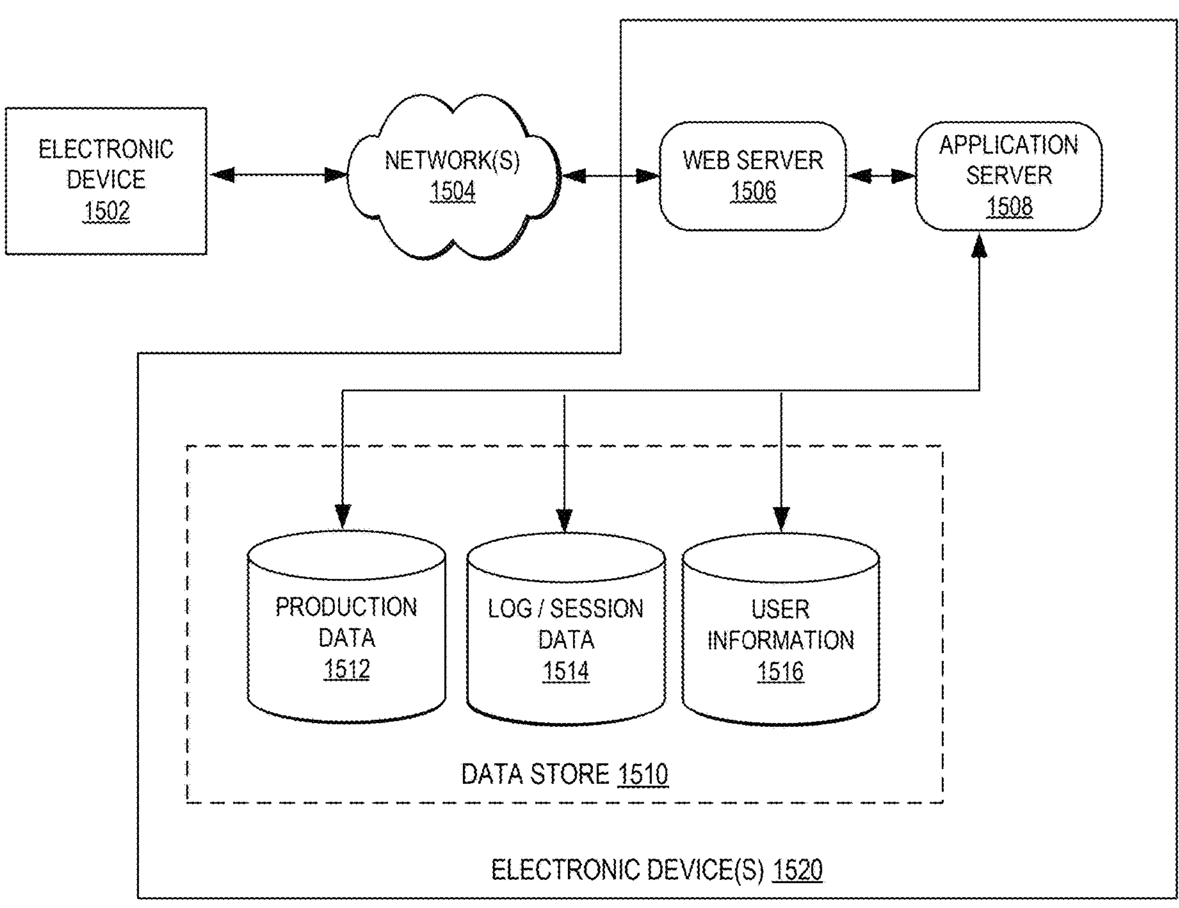
FIG. 15 illustrates an example of an environment for implementing aspects in accordance with various examples.

As discussed, different approaches can be implemented in various environments in accordance with the described examples. For example, FIG. 15 illustrates an example of an environment 1500 for implementing aspects in accordance with various examples. For example, in some examples messages are HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various examples. The system includes an electronic client device 1502, which may also be referred to as a client device and can be any appropriate device operable to send and receive requests, messages, or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1218A-1218N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving, at a content delivery service from a media player device, a manifest request comprising a plurality of manifest request parameters for a media file;

determining, by the content delivery service, a first node of a tree data structure based on a first manifest request parameter of the plurality of manifest request parameters of the manifest request;

determining, by the content delivery service, a second node of the tree data structure based on a second manifest request parameter of the plurality of manifest request parameters of the manifest request;

determining, by the content delivery service, a third node of the tree data structure based on the first manifest request parameter and the second manifest request parameter of the plurality of manifest request parameters of the manifest request;

determining, by the content delivery service, a first manifest instruction from the first node, a second manifest instruction from the second node, and a third manifest instruction from the third node;

generating, by the content delivery service, a manifest for the media file based on the first manifest instruction, the second manifest instruction, and the third manifest instruction; and sending, by the content delivery service, the manifest to the media player device.

2. The computer-implemented method of claim 1, wherein the generating the manifest comprises:

determining, by the content delivery service, that two or more of the first manifest instruction, the second manifest instruction, and the third manifest instruction are contradicting; and selecting, by the content delivery service, one manifest instruction of the two or more of the first manifest instruction, the second manifest instruction, and the third manifest instruction based on corresponding positions of the first node, the second node, and the third node in the tree data structure, wherein the generating the manifest is based on the one manifest instruction.

3. The computer-implemented method of claim 1, wherein the generating the manifest comprises:

determining, by the content delivery service, that two or more of the first manifest instruction, the second manifest instruction, and the third manifest instruction have a non-contradicting and differing range; and combining, by the content delivery service, the two or more of the first manifest instruction, the second manifest instruction, and the third manifest instruction based on the non-contradicting and differing range into a single manifest instruction, wherein the generating the manifest is based on the single manifest instruction.

4. A computer-implemented method comprising:

receiving a manifest request comprising a plurality of manifest request parameters for a media file;

determining a first node of a hierarchical data structure based on a first manifest request parameter of the plurality of manifest request parameters of the manifest request;

determining a second node of the hierarchical data structure based on a second manifest request parameter of the plurality of manifest request parameters of the manifest request;

determining a third node of the hierarchical data structure based on the first manifest request parameter and the second manifest request parameter of the plurality of manifest request parameters of the manifest request;

determining a first manifest instruction from the first node, a second manifest instruction from the second node, and a third manifest instruction from the third node;

generating a manifest for the media file based on the first manifest instruction, the second manifest instruction, and the third manifest instruction; and accessing the media file based on the manifest.

5. The computer-implemented method of claim 4, wherein the generating the manifest comprises:

determining that two or more of the first manifest instruction, the second manifest instruction, and the third manifest instruction are contradicting; and selecting one manifest instruction of the two or more of the first manifest instruction, the second manifest instruction, and the third manifest instruction based on corresponding positions of the first node, the second node, and the third node in the hierarchical data structure, wherein the generating the manifest is based on the one manifest instruction.

6. The computer-implemented method of claim 5, wherein the hierarchical data structure is a tree data structure of manifest request parameters, and the selecting the one manifest instruction based on the corresponding positions comprises determining a deepest node of the first node, the second node, and the third node in the tree data structure of manifest request parameters, and selecting a corresponding manifest instruction from the deepest node as the one manifest instruction.

7. The computer-implemented method of claim 5, wherein the two or more of the first manifest instruction, the second manifest instruction, and the third manifest instruction that are contradicting comprise one manifest instruction for a single key digital rights management instruction and another manifest instruction for a dual key digital rights management instruction.

8. The computer-implemented method of claim 4, wherein the receiving is at a content delivery service and the manifest request is from a media player device, and the computer-implement method further comprises:

determining an additional parameter for the request by the content delivery service;

determining a fourth node of the hierarchical data structure based on the additional parameter; and determining a fourth manifest instruction from the fourth node, wherein the generating the manifest is also based on the fourth manifest instruction.

9. The computer-implemented method of claim 4, wherein the generating the manifest comprises:

determining that two or more of the first manifest instruction, the second manifest instruction, and the third manifest instruction have an overlap; and combining the two or more of the first manifest instruction, the second manifest instruction, and the third manifest instruction based on the overlap into a single manifest instruction, wherein the generating the manifest is based on the single manifest instruction.

10. The computer-implemented method of claim 9, wherein the combining is according to a first merging policy for a first type of manifest instructions, and a second merging policy for a second type of manifest instructions.

11. The computer-implemented method of claim 10, wherein the first merging policy is selecting a maximum value from a plurality of overlapping values within the first type of manifest instructions.

12. The computer-implemented method of claim 11, wherein the second merging policy is selecting a minimum value from a plurality of overlapping values within the second type of manifest instructions.

13. The computer-implemented method of claim 10, wherein the second merging policy is selecting a minimum value from a plurality of overlapping values within the second type of manifest instructions.

14. The computer-implemented method of claim 4, further comprising generating the first node of the hierarchical data structure based on receipt of the first manifest request parameter.

15. A non-transitory computer-readable medium storing code that, when executed by a device, causes the device to perform a method comprising:

receiving a manifest request comprising a plurality of manifest request parameters for a media file;

determining a first node of a hierarchical data structure based on a first manifest request parameter of the plurality of manifest request parameters of the manifest request;

determining a second node of the hierarchical data structure based on a second manifest request parameter of the plurality of manifest request parameters of the manifest request;

determining a third node of the hierarchical data structure based on the first manifest request parameter and the second manifest request parameter of the plurality of manifest request parameters of the manifest request;

determining a first manifest instruction from the first node, a second manifest instruction from the second node, and a third manifest instruction from the third node;

generating a manifest for the media file based on the first manifest instruction, the second manifest instruction, and the third manifest instruction; and accessing the media file based on the manifest.

16. The non-transitory computer-readable medium of claim 15, wherein the generating the manifest comprises:

determining that two or more of the first manifest instruction, the second manifest instruction, and the third manifest instruction are contradicting; and selecting one manifest instruction of the two or more of the first manifest instruction, the second manifest instruction, and the third manifest instruction based on corresponding positions of the first node, the second node, and the third node in the hierarchical data structure, wherein the generating the manifest is based on the one manifest instruction.

17. The non-transitory computer-readable medium of claim 16, wherein the hierarchical data structure is a tree data structure of manifest request parameters, and the selecting the one manifest instruction based on the corresponding positions comprises determining a deepest node of the first node, the second node, and the third node in the tree data structure of manifest request parameters, and selecting a corresponding manifest instruction from the deepest node as the one manifest instruction.

18. The non-transitory computer-readable medium of claim 15, wherein the receiving is at a content delivery service and the manifest request is from a media player device, and the method further comprises:

determining an additional parameter for the request by the content delivery service;

determining a fourth node of the hierarchical data structure based on the additional parameter; and determining a fourth manifest instruction from the fourth node, wherein the generating the manifest is also based on the fourth manifest instruction.

19. The non-transitory computer-readable medium of claim 15, wherein the generating the manifest comprises:

determining that two or more of the first manifest instruction, the second manifest instruction, and the third manifest instruction have an overlap; and combining the two or more of the first manifest instruction, the second manifest instruction, and the third manifest instruction based on the overlap into a single manifest instruction, wherein the generating the manifest is based on the single manifest instruction.

20. The non-transitory computer-readable medium of claim 19, wherein the combining is according to a first merging policy for a first type of manifest instructions, and a second merging policy for a second type of manifest instructions.

* * * * *